United States Patent
Uno

(10) Patent No.: US 7,870,304 B2
(45) Date of Patent: Jan. 11, 2011

(54) DEVICE AND FILE TRANSFER SYSTEM

(75) Inventor: Fumitoshi Uno, Okazaki (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 211 days.

(21) Appl. No.: 12/202,925

(22) Filed: Sep. 2, 2008

(65) Prior Publication Data

US 2009/0063721 A1 Mar. 5, 2009

(30) Foreign Application Priority Data

Aug. 30, 2007 (JP) ............... 2007-224537

(51) Int. Cl.
*G06F 3/00* (2006.01)
*G06F 13/12* (2006.01)
(52) U.S. Cl. ............... 710/14; 710/8; 710/36; 710/62
(58) Field of Classification Search ............... 710/8, 710/14, 36, 62
See application file for complete search history.

(56) References Cited

U.S. PATENT DOCUMENTS

| 2005/0023339 A1* | 2/2005 | Uno | 235/375 |
| 2006/0221718 A1* | 10/2006 | Ono | 365/189.04 |
| 2007/0177822 A1 | 8/2007 | Uno | |
| 2007/0245055 A1* | 10/2007 | Minami | 710/305 |

FOREIGN PATENT DOCUMENTS

| JP | 2000-148651 | 5/2000 |
| JP | 2000-207322 | 7/2000 |
| JP | 2004-94493 | 3/2004 |
| JP | 2006-331088 | 12/2006 |
| JP | 2007-200235 | 8/2007 |

OTHER PUBLICATIONS

Japanese Official Action dated Jul. 14, 2009, together with an English-language translation.
U.S. Official Action dated May 28, 2010.

* cited by examiner

*Primary Examiner*—Alford W Kindred
*Assistant Examiner*—David E Martinez
(74) *Attorney, Agent, or Firm*—Scully, Scott, Murphy & Presser, P.C.

(57) ABSTRACT

A device is connectable to a computer through USB interface. The device includes a mode switching section configured to switch the device to one of a first mode and a second mode in which an access from the computer to a USB storage device is permitted and prohibited, respectively. When a standard data string is received and the device is in the first mode, the device accesses the physical storage area of the data storage section. When the standard data string is received and the device is in the second mode, the device transmits a pseudo response to the computer, the pseudo response indicating that no storage medium is mounted to the data storage section. When a particular data string is received, the device accesses a file through a file system provided in the device.

8 Claims, 21 Drawing Sheets

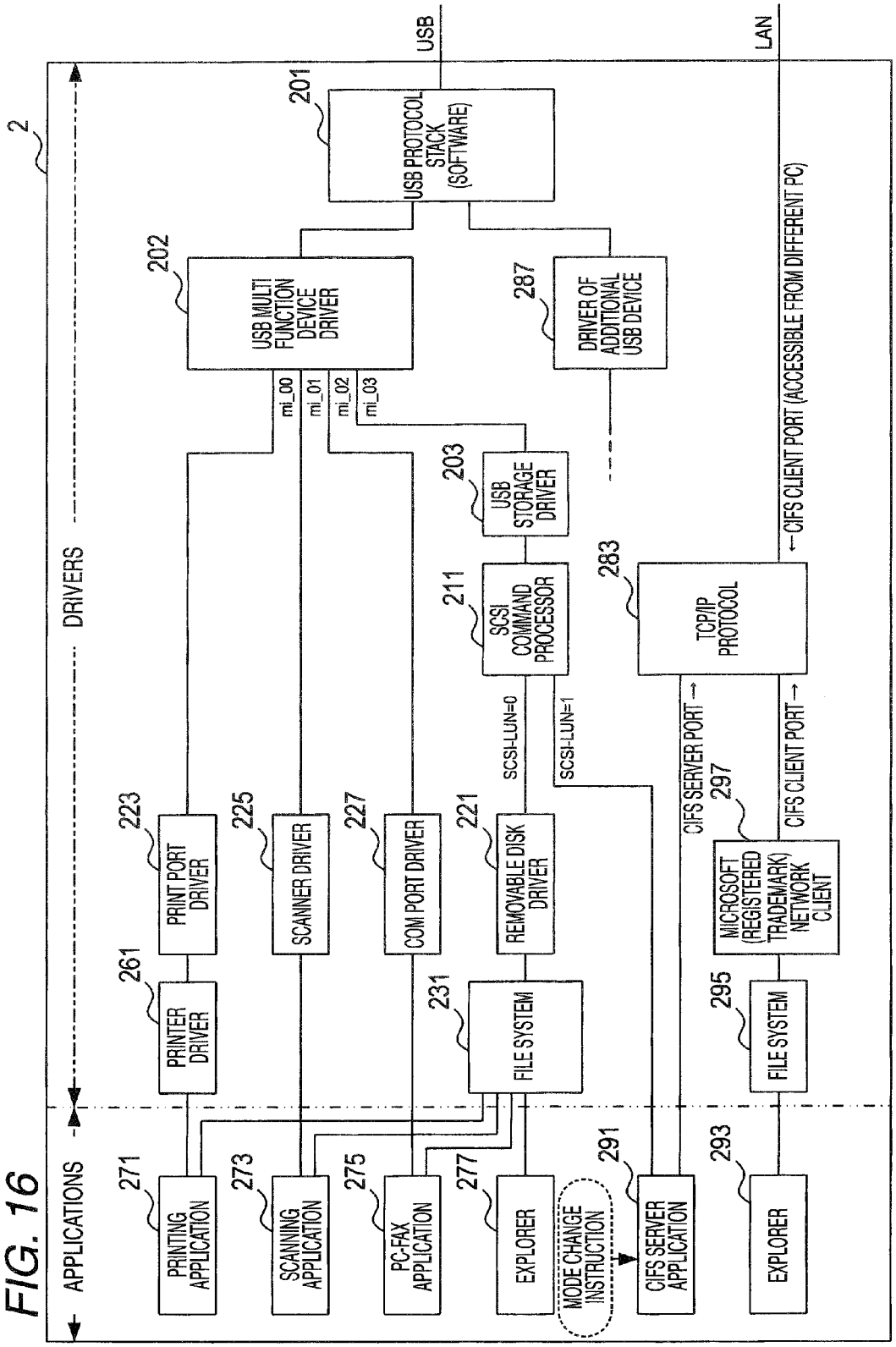

DEVICE AND FILE TRANSFER SYSTEM

CROSS-REFERENCE TO RELATED APPLICATIONS

This application is based upon and claims priority from Japanese Patent Application No. 2007-224537 filed on Aug. 30, 2007, the entire contents of which are incorporated herein by reference.

TECHNICAL FIELD

The present invention relates to a device capable of functioning as a USB storage device, and a file transfer system including a device and a computer.

BACKGROUND

As a USB (Universal Serial Bus) connectable flash memory card reader/writer, a USB storage type (based on the USB Mass Storage Class) is predominantly the mainstream, and there are hardly other types.

A USB connectable multi function device having the card reader/writer function and other functions (for example, a multi function device having a printer or scanner function) is also modeled after the stand-alone card reader/writer.

For this reason, in most models, the card reader/writer function is recognized by the PC (personal computer) as a USB storage type device.

Meanwhile, in a multi function device having the card reader/writer function, if an internal controller of a multi function device and a PC connected to the multi function device simultaneously access the memory card, many problems may occur.

Accordingly, in order to resolve these problems, JP-A-2004-94493 describes a technology that enables the internal controller of the multi function device and the PC connected to the multi function device to exclusively access the memory card.

However, if the access to the memory card is simply exclusively executed as described above, the memory card tends to be easily occupied by the PC for a comparatively long time. For this reason, the internal controller of the multi function device is liable to go into the situation that cannot access the memory card. Then, a user who frequently uses the multi function device as a stand-alone device may feel inconvenience of using the multi function device.

The reason why the PC occupies comparatively long time is that the PC and the internal controller of the multi function device access the memory card by different access methods. The details are as follows. First, an access from the PC to the memory card will be described. When accessing a file on the USB storage device, the PC accesses the memory card through a file system provided therein.

At this time, a request to access a physical storage area in the memory card (for example, a request to read data from the physical storage area or a request to write data to the physical storage area) is input from the PC to the multi function device. Meanwhile, no explicit notification indicating that the access from the PC to the memory card is completed is input from the file system provided in the PC.

Accordingly, the device can only guess that "if the PC does not access until a predetermined standby time elapses, the access from the PC is recognized as being completed". As a result, for the standby time, the access authority to the memory card is wastefully occupied by the PC.

Next, an access from the internal controller of the multi function device will be described. The internal controller of the multi function device accesses the memory card through a file system provided in the device.

At this time, if the access to the memory card by the file system provided in the device is completed, the internal controller of the multi function device can immediately recognize that the access to the memory card is completed. In this case, therefore, unlike the access from the PC, the device does not need to stand by until the standby time elapses, and thus there is no case in which the internal controller of the multi function device wastefully occupies the access authority to the memory card.

In this case, it should not be interpreted that the access request from the PC is intentionally preferentially processed. In the event, however, due to the difference in the access method, the occupation time by the PC is likely to be extended, and the internal controller of the multi function device is likely to go into the situation that cannot access the memory card.

SUMMARY

One aspect of the invention has been conceived in view of the above circumstances and has an object to provide a device which is capable of rapidly processing an access request from an internal controller of the device while an access request is input from a PC and another object to provide a file transfer system comprising such a device.

According an aspect of the invention, there is provided a device that is connectable to a computer through a USB (Universal Serial Bus) interface and is recognized by the computer as a "USB multi function device capable of functioning as a plurality of devices comprising at least a USB storage device" or a "USB storage device", the device comprising: a data storage section configured to access a data storable physical storage area, and read data stored in the physical storage area or write data to the physical storage area; a file system configured to manage data to be stored in the physical storage area of the data storage section as a file, provide an interface for accessing to the file, and enable reading of data stored in the file or writing of data to the file by an access with the interface; a data processing section configured to execute a predetermined data processing, and during the data processing, access the file through the file system; a mode switching section configured to switch the device to one of a first mode in which an access from the computer to the USB storage device is permitted and a second mode in which an access from the computer to the USB storage device is prohibited; a data analysis section configured to, when a data string is transmitted from the computer through a logical data transmission line between the computer and the USB storage device, analyze whether the data string is a standard data string transmitted for an access to the USB storage device or a particular data string other than the standard data string; a mode determination section configured to, when the data analysis section analyzes that the data string is the standard data string, determine which of the first and second modes is selected by the mode switching section; a physical area unit access section configured to, when the mode determination section determines that the device is switched to the first mode, access the physical storage area of the data storage section based on information in the standard data string, and transmit response data corresponding to the access to the computer through the data transmission line; a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the data string is the particular data string, access a file through the file system based on information in the particular data string, and transmit response data corresponding to the access to the computer through the data transmission line.

According to another aspect of the invention, there is provided a file transfer system comprising: a computer; and a device connectable to the computer through a USB (Universal Serial Bus) interface and being recognized by the computer as a USB multi function device capable of functioning as a plurality of devices comprising at least a USB storage device" or a "USB storage device", wherein the device comprises: a data storage section configured to access a data storable physical storage area, and read data stored in the physical storage area or write data to the physical storage area; a file system configured to manage data to be stored in the physical storage area of the data storage section as a file, provide an interface for accessing to the file, and enable reading of data stored in the file or writing of data to the file by an access with the interface; a data processing section configured to execute a predetermined data processing, and during the data processing, access the file through the file system; a mode switching section configured to switch the device to one of a first mode in which an access from the computer to the USB storage device is permitted and a second mode in which an access from the computer to the USB storage device is prohibited; a data analysis section configured to, when a data string is transmitted from the computer through a logical data transmission line between the computer and the USB storage device, analyze whether the data string is a standard data string transmitted for an access to the USB storage device or a particular data string other than the standard data string; a mode determination section configured to, when the data analysis section analyzes that the data string is the standard data string, determine which of the first and second modes is selected by the mode switching section; a physical area unit access section configured to, when the mode determination section determines that the device is switched to the first mode, access the physical storage area of the data storage section based on information in the standard data string, and transmit response data corresponding to the access to the computer through the data transmission line; a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the data string is the particular data string, access a file through the file system based on information in the particular data string, and transmit response data corresponding to the access to the computer through the data transmission line, and wherein the computer comprises a server computer that is capable of transmitting a file to a client computer having a client function, and on the basis of an access request from the client computer, the computer is configured to transmit the access request to the file unit access section provided in the device through the data transmission line and to transmit the response data from the device according to the access request to the client computer.

BRIEF DESCRIPTION OF THE DRAWINGS

FIG. 16 is a block diagram showing the internal configuration of a PC according to a second embodiment of the invention;

DESCRIPTION

Figure 1:
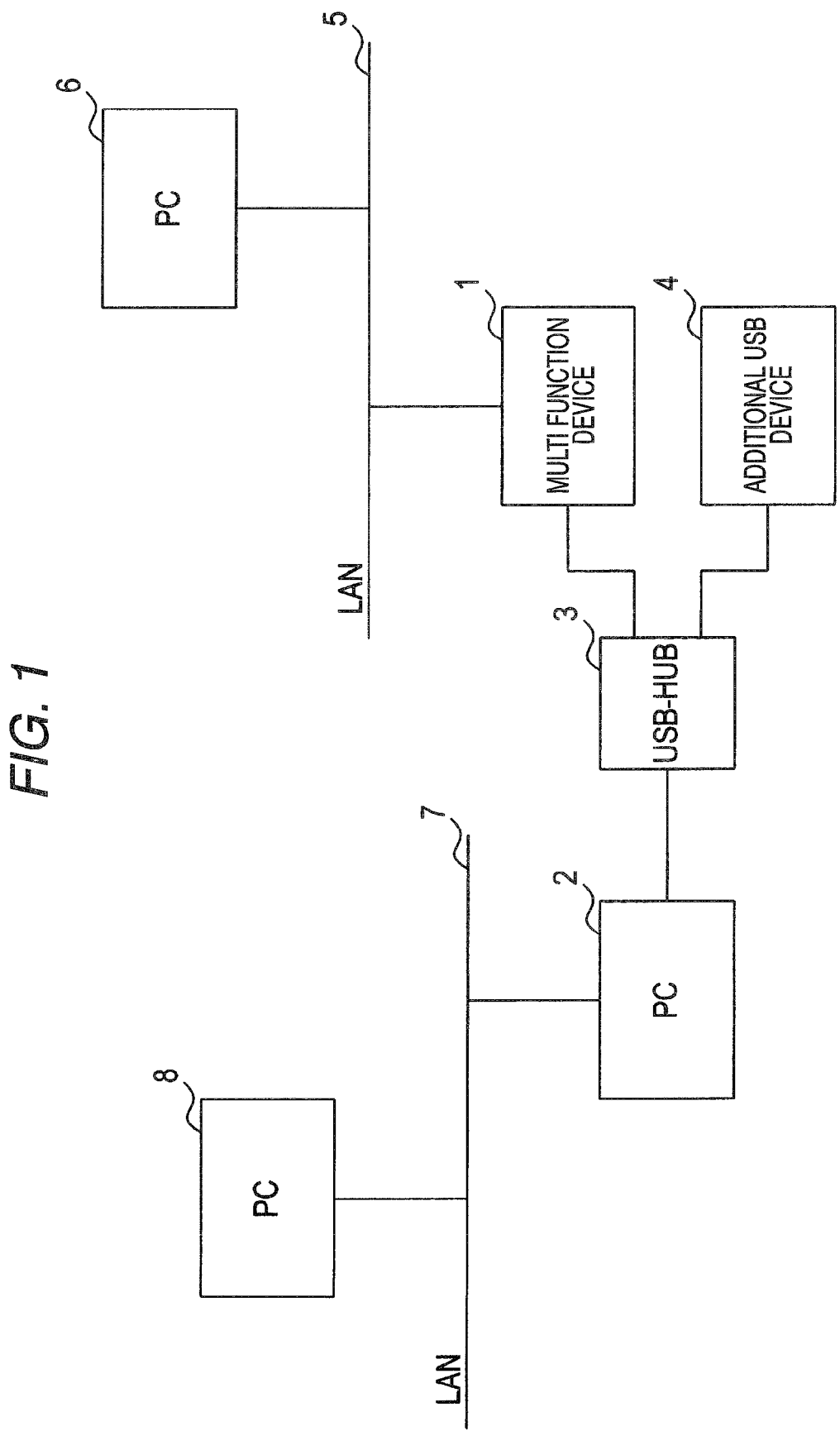
FIG. 1 is a block diagram of an entire file transfer system according to a first embodiment of the invention.

Hereinafter, the configurations according to aspects of the invention will be described.

According to a first aspect of the invention, there is provided a device that is connectable to a computer through a USB (Universal Serial Bus) interface and is recognized by the computer as a "USB multi function device capable of functioning as a plurality of devices comprising at least a USB storage device" or a "USB storage device", the device comprising: a data storage section configured to access a data storable physical storage area, and read data stored in the physical storage area or write data to the physical storage area; file system configured to manage data to be stored in the physical storage area of the data storage section as a file, provide an interface for accessing to the file, and enable reading of data stored in the file or writing of data to the file by an access with the interface; a data processing section configured to execute a predetermined data processing, and during the data processing, access the file through the file system; a mode switching section configured to switch the device to one of a first mode in which an access from the computer to the USB storage device is permitted and a second mode in which an access from the computer to the USB storage device is prohibited; a data analysis section configured to, when a data string is transmitted from the computer through a logical data transmission line between the computer and the USB storage device, analyze whether the data string is a standard data string transmitted for an access to the USB storage device or a particular data string other than the standard data string; a mode determination section configured to, when the data analysis section analyzes that the data string is the standard data string, determine which of the first and second modes is selected by the mode switching section; a physical area unit access section configured to, when the mode determination section determines that the device is switched to the first mode, access the physical storage area of the data storage section based on information in the standard data string, and transmit response data corresponding to the access to the computer through the data transmission line; a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the data string is the particular data string, access a file through the file system based on information in the particular data string, and transmit response data corresponding to the access to the computer through the data transmission line.

With this device, when the device is connected to the computer through a USB interface, the computer recognizes the device as a device having a function as a USB storage device. At this time, for data communication with the USB storage device, the computer loads a USB storage driver and the like. Then, a logical data transmission line is constituted between the computer and the device.

Here, the computer and the device of the USB storage class perform data transmission according to the communication procedure based on the USB standard. However, the USB standard defines such that the device of the USB storage class internally performs data transmission based on the SCSI standard.

For this reason, the logical data transmission line between the computer and the USB storage device is constituted based on the USB standard. Therefore, the logical data transmission line becomes a data transmission line through which a data string having the format based on the SCSI standard (hereinafter, also simply referred to as SCSI data) can be transmitted.

If such a data transmission line is constituted, then, the computer can perform an access to the USB storage device. At this time, while data is transmitted from the computer to the device according to the communication procedure based on the USB standard, SCSI data is also transmitted.

Although SCSI data can be transmitted through the data transmission line, the data transmission line has no concern with whether or not SCSI data is data for an actual access to the USB storage device. Therefore, data can be transmitted through the data transmission line, insofar as data is based on the SCSI standard, regardless of whether or not data is data for an access to the USB storage device.

The device of the aspects of the invention is configured to transmit the standard data string for an access to the USB storage device and the particular data string other than the standard data string by using the characteristics of the data transmission line.

When the standard data string is transmitted, as defined in the USB standard, it is handled as data for an access to the USB storage device. Meanwhile, when the particular data string is transmitted, a uniquely defined processing is executed. Specifically, as one of the uniquely defined processing, an access to a file through a file system in the device is executed on the basis of information in the particular data string.

With this configuration, unlike a case where the standard data string is transmitted, by transmitting the particular data string from the computer to the additional device, an access to a file through the file system in the device can be achieved. In addition, the data processing section in the device also accesses a file through the file system in the device when a predetermined data processing is executed.

That is, an access request from the computer and an access request from the data processing section in the device are both processed through the file system in the device. Therefore, unlike a usual USB storage device, it is not necessary to stand by for a predetermined standby time so as to determine whether or not an access from the computer is completed, and thus there is no case where the access authority to the data storage section is wastefully occupied the computer.

Accordingly, as for the access request from the computer and the access request from the data processing section in the device, immediately after one access request is processed, the other one can be processed. As a result, a rapid processing can be achieved.

In addition, the device of the aspects of the invention is configured to be switched to one of the first mode in which an access from the computer to the USB storage device is permitted and the second mode in which an access from the computer to the USB storage device is prohibited.

When the computer accesses the USB storage device and the standard data string is transmitted from the computer, if the device is switched to the first mode, an access from the computer to the USB storage device is permitted. In this case, the device is operated in the same manner as a usual USB storage device.

When the computer accesses the USB storage device and the standard data string is transmitted from the computer, if the device is switched to the second mode, an access from the computer to the USB storage device is prohibited. In this case, a pseudo response indicating that no storage medium is mounted to the data storage section is transmitted to the computer.

By returning such a response, while connection between the computer and the device is maintained, an access from the computer to the USB storage device can be blocked. In this state, in order to achieve an access from the computer to the device, the particular data string is used, and accordingly the computer can access the files in the device through the file system of the device.

That is, whichever of the first and second modes is selected, the state where the computer has recognized the device as the USB storage device is maintained. Accordingly, the logical data transmission line through which SCSI data can be transmitted can be also maintained.

If the device is in the first mode, the device functions as a usual USB storage device, and if the device is in the second mode, the functions as the USB storage device are invalidated, except for a function to return a response indicating that no storage medium is set. Therefore, if the device is in the second mode, the particular data string is available.

With this configuration, if the device is switched to the first mode, the device can function as a usual USB storage device. Therefore, many commercially available applications compliant with the USB storage device can be used without any problems.

In addition, if the device is switched to the second mode, an access request from the computer and an access request from the data processing section in the device may be both rapidly processed.

Therefore, according to a user's intention, for example, when the function as the USB storage device is emphasized, the device may be switched to the first mode, and when the user wants to rapidly process the function of the data processing section in the device, the device may be switched to the second mode.

In addition, whichever of the first and second modes is selected, as the data transmission line between the device and the computer, a single data transmission line based on the USB standard is used. Therefore, communication interfaces do not need to be provided separately for the first mode and the second mode, and accordingly the configuration of the device (particularly, hardware) can be simplified. As a result, the device can be provided at low cost, as compared with communication interfaces are provided separately for the first mode and the second mode.

According to a second aspect of the invention, in the device according to the first aspect of the invention, the data analysis section may determine, on the basis of a data string based on the SCSI standard transmitted from the computer through the data transmission line, whether the data string is the standard data string or the particular data string according to whether or not the value of an LUN (Logical Unit Number) field in the data string is "0".

Here, the SCSI standard defines that the device based on the SCSI-2 specification and later disregards the value of the LUN field in the SCSI data string, in which "0" is usually stored. For this reason, when the USB storage device transmits SCSI data based on the SCSI-2 specification, the value of the LUN field is usually set to "0".

Therefore, in the device according to the second aspect of the invention, when the value of the LUN field is set to "0", the data string is identified as the standard data string. When the value of the LUN field is set to be other than "0", the data string is identified as the particular data string.

With this configuration, according to the value of the LUN field, the computer can assign whether to perform an access to the USB storage device or to perform a file access through the file system in the device.

According to a third aspect of the invention, the device according to the first or second aspect of the invention may further comprise a file access request determination section that, when the data analysis section analyzes that the data string is the particular data string, on the basis of information in the particular data string, determines whether or not the particular data string is a data string requesting to access the file. In this case, when the file access request determination section determines that the particular data string is the data string requesting to access the file, the file unit access section may access the file through the file system, and may transmit a response data corresponding to the access to the computer through the data transmission line.

With this configuration, as the particular data string, a data string requesting to access a file and other data strings can be used. Therefore, when an access to the file is requested and when other controls are directed to the device, the particular data string becomes available.

According to a fourth aspect of the invention, the device according to the third aspect of the invention may further comprise a mode switching request determination section that, when the data analysis section analyzes that the data string is the particular data string, on the basis of information in the particular data string, determines whether or not the particular data string is a data string requesting the mode switching section of mode switching. In this case, when the mode switching request determination section determines that the particular data string is the data string requesting of mode switching, the mode switching section may switch the device to one of the first mode and the second mode on the basis of information in the particular data string.

With this configuration, as the particular data string, a data string for requesting to access a file and a data string requesting of mode switching can be used. Therefore, when an access to a file is requested and when the computer requests the device of mode switching, the particular data string becomes available.

According to a fifth aspect of the invention, in the device according to any one of the first to fourth aspects of the invention, the device may be a multi function device having at least a printer function and a memory card function, and the data processing section may be adapted to execute a data processing to print an image on the basis of image data read from a file on a memory card, and during the data processing, access the file through the file system.

With this device, when the device is switched to the first mode, the device, that is, the multi function device can function as a USB storage device. In addition, when the device is switched to the second mode, while a file access from the computer is permitted (that is, the card reader function is kept to be available), to have a "function to print a file on the memory card" a by the data processing section in the device becomes available.

According to a sixth aspect of the invention, in the device according to any one of the first to fourth aspects of the invention, the device may be a digital camera having at least a still image capturing function, and the data processing section may be adapted to execute a data processing to write a captured still image to a file on a memory, and during the data processing, access the file through the file system.

With this device, when the device is switched to the first mode, the device which is the digital camera can function as a USB storage device. In addition, when the device is switched to the second mode, while a file access from the computer is permitted (that is, the card reader function is kept to be available), a function to capture a still image by the data processing section in the device becomes available.

According to a seventh aspect of the invention, in the device according to any one of the first to fourth aspects of the invention, the device may be a portable audio player having at least a music reproducing function, and the data processing section may be adapted to execute a data processing to reproduce music on the basis on audio data read from a file on a memory, and during the data processing, access the file through the file system.

With this device, when the device is switched to the first mode, the device which is the potable audio player functions as a USB storage device. In addition, when the device is switched to the second mode, while a file access from the computer is permitted (that is, the card reader function is kept to be available), a function to reproduce music by the data processing section in the device becomes available.

According to an eighth aspect of the invention, a file transfer system comprises a computer and the device according to any one of the first to seventh aspects of the invention, the device being connected to the computer through a USB interface. The computer is a server computer that is capable of transmitting a file to a client computer having a client function, and on the basis of an access request from the client computer, the computer is adapted to transmit the access request to the file unit access section provided in the device through the data transmission line and to transmit the response data from the device according to the access request to the client computer.

With this file transfer system, the client computer can access a file on the device through the server computer. Therefore, a plurality of client computer can access a file on the device.

Next, illustrative embodiments of the invention will be described by way of specific examples.

(1) FIRST EMBODIMENT

First, a first embodiment will be described.
(Configuration of File Transfer System)
FIG. 1 is a block diagram of an entire file transfer system according to an embodiment of the invention.

The file transfer system primarily includes a multi function device 1 and a PC (Personal Computer) 2. The multi function device 1 and the PC 2 respectively have USB interfaces, and are connected with each other through a USB-HUB 3 so as to perform data transmission between them. To the USB-HUB 3, an additional USB device 4 and the like are also connected.

The multi function device 1 and the PC 2 respectively have LAN interfaces. The multi function device 1 can perform data transmission with a device connected to a LAN 5 (for example, PC 6), and the PC 2 can perform data transmission with a device connected to a LAN 7 (for example, a PC 8).

In this embodiment, the multi function device 1 is a multi function device having a printer function, a scanner function, a PC-FAX function, and a card reader function. These functions can be controlled by the PC 2.

Figure 2:
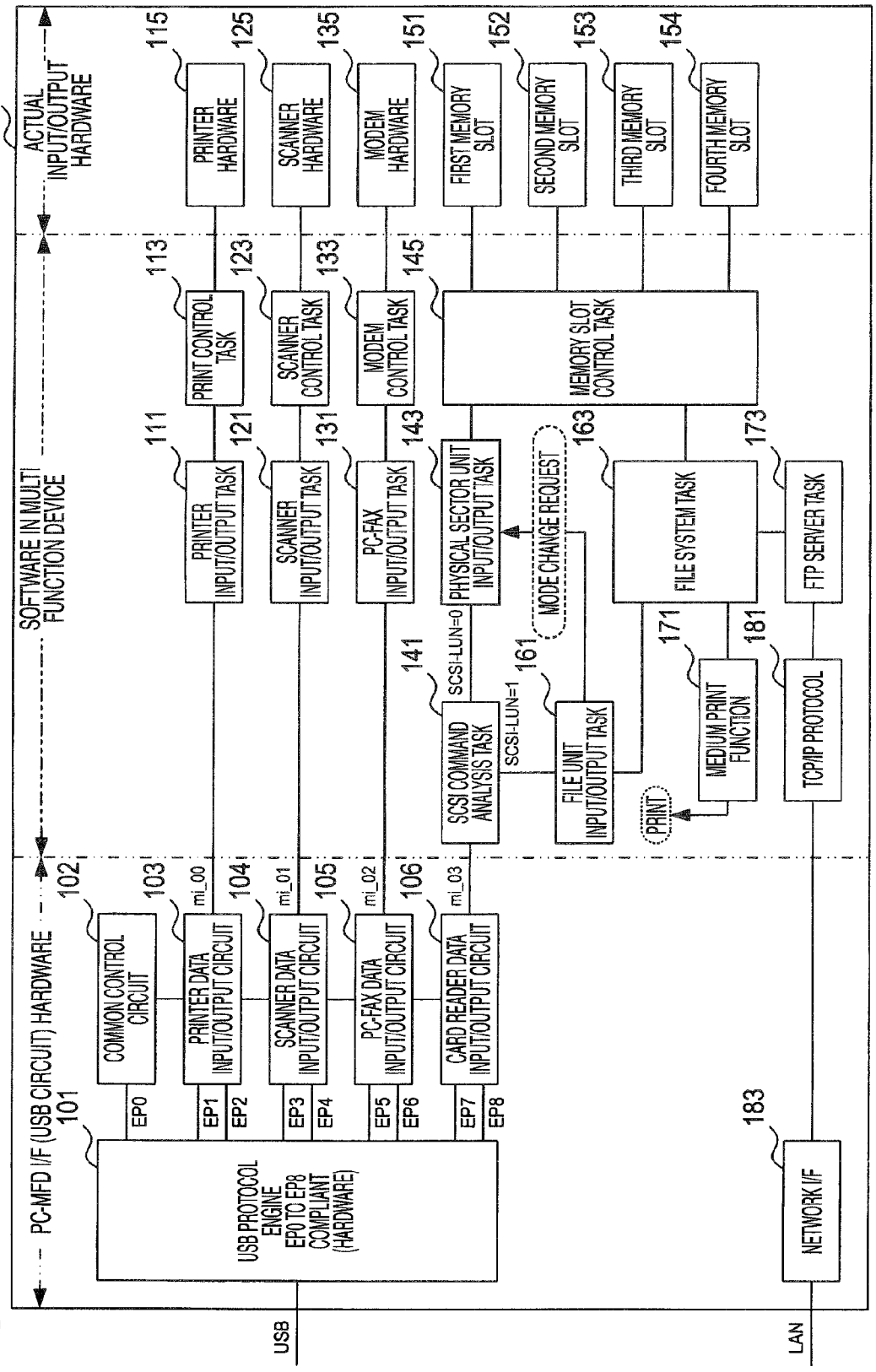
FIG. 2 is a block diagram showing the internal configuration of a multi function device.

(Internal Configuration of Multi Function Device)
FIG. 2 is a block diagram illustrating the internal configuration of the multi function device 1.

The multi function device 1 includes, as hardware constituting the USB interface, a USB protocol engine 101, a common control circuit 102, a printer data input/output circuit 103, a scanner data input/output circuit 104, a PC-FAX data input/output circuit 105, and a card reader data input/output circuit 106.

At the time of data transmission with the PC 2, data is transmitted according to the communication protocol based on the USB standard under the control of the USB protocol engine 101. The circuits are configured to perform data transmission with the PC 2 through an end point.

Specifically, the common control circuit 102 performs data input/output (two-way communication) with the PC 2 through an end point for protocol transfer (hereinafter, referred to as "EP0").

The printer data input/output circuit 103, the scanner data input/output circuit 104, the PC-FAX data input/output circuit 105, and the card reader data input/output circuit 106 perform data transmission with the PC 2 through an end point for input data and an end point for output data (hereinafter, referred to as "EP1 to EP8"), respectively.

When data is transmitted to the printer data input/output circuit 103, data is transmitted to a printer input/output task 111. Data which is transmitted to the printer input/output task 111 is then transmitted to a print control task 113, and thus printer hardware 115 is controlled by the print control task 113.

When data is transmitted to the scanner data input/output circuit 104, data is transmitted to the scanner input/output task 121. Data which is transmitted to the scanner input/output task 121 is then transmitted to a scanner control task 123, and thus scanner hardware 125 is controlled by the scanner control task 123.

When data is transmitted to the PC-FAX data input/output circuit 105, data is transmitted to a PC-FAX input/output task 131. Data which is transmitted to the PC-FAX input/output task 131 is then transmitted to a modem control task 133, and thus modem hardware 135 is controlled by the modem control task 133.

When data is transmitted to the card reader data input/output circuit 106, data is transmitted to the SCSI command analysis task 141.

The SCSI command analysis task 141 distributes data into one of two data processing systems on the basis of information in data. The SCSI command analysis task 141 serves as an example of a data analysis section.

Specifically, data to be transmitted to the SCSI command analysis task 141 includes a command of SCSI data (hereinafter, also referred to "SCSI command") which is issued by the PC 2. In the SCSI command, a region, called a LUN field, is provided.

The SCSI command analysis task 141 determines, on the basis of the value of the LUN field (hereinafter, referred to as "SCSI-LUN"), determines a distribution destination of output data from the PC 2. A specific processing to be executed in the SCSI command analysis task 141 will be described below in detail.

When the SCSI command analysis task 141 distributes data into the SCSI-LUN=0 side (see FIG. 2), data is transmitted to the physical sector unit input/output task 143. The physical sector unit input/output task 143 serves as an example of a physical area unit access section.

The physical sector unit input/output task 143 transmits received data to the memory slot control task 145. This will be described below in detail. Then, the memory slot control task 145 controls the first memory slot 151, the second memory slot 152, the third memory slot 153, and the fourth memory slot 154.

Each of the first memory slot 151, the second memory slot 152, the third memory slot 153, and the fourth memory slot 154 allows a memory card to be mounted thereto. These memory card slots 151 to 154 may allow memory cards based on different standards to be mounted thereto, respectively. The first memory slot 151, the second memory slot 152, the third memory slot 153, and the fourth memory slot 154 serves as an example of a data storage section.

In this embodiment, the first memory slot 151, the second memory slot 152, the third memory slot 153, and the fourth memory slot 154 are exclusively available. For example, when a memory card is mounted to the first memory slot 151, other slots are not available until the memory card is removed.

When the SCSI command analysis task 141 distributes data into the SCSI-LUN=1 side (see FIG. 2), data is transmitted to the file unit input/output task 161. The file unit input/output task 161 serves as an example of a file unit access section.

The file unit input/output task 161 transmits received data to the memory slot control task 145 through the file system task 163. In addition, the file unit input/output task 161 requests the physical sector unit input/output task 143 of a mode change. These will be described below in detail. The file system task 163 serves as an example of a file system.

If data is transmitted from the file unit input/output task 161 to the memory slot control task 145 through the file system task 163, the memory slot control task 145 also controls the first memory slot 151, the second memory slot 152, the third memory slot 153, and the fourth memory slot 154.

The multi function device 1 further includes a medium print function 171 and an FTP (File Transfer Protocol) server task 173. The medium print function 171 and the FTP server task 173 serve as an example of a data processing section, and control a function to be executed by the multi function device 1 as a stand-alone device independently from the PC 2.

Specifically, the medium print function 171 controls a function to read an image file from a memory card mounted to one of the first memory slot 151, the second memory slot 152, the third memory slot 153, and the fourth memory slot 154, and to print the image file.

When the medium print function 171 reads the image file, similarly to the file unit input/output task 161, data is transmitted to the memory slot control task 145 through the file system task 163. Accordingly, an access to the image file is executed.

When a device (for example, the PC 6) on the LAN 5 to which the multi function device 1 is connected requests an access to a file on a memory card mounted to one of the first memory slot 151, the second memory slot 152, the third memory slot 153, and the fourth memory slot 154, the FTP server task 173 processes the access request.

When the FTP server task 173 accesses a file, similarly to the file unit input/output task 161, data is transmitted to the memory slot control task 145 through the file system task 163. Thus, an access to the file is executed.

(Internal Configuration of PC)

Figure 3:
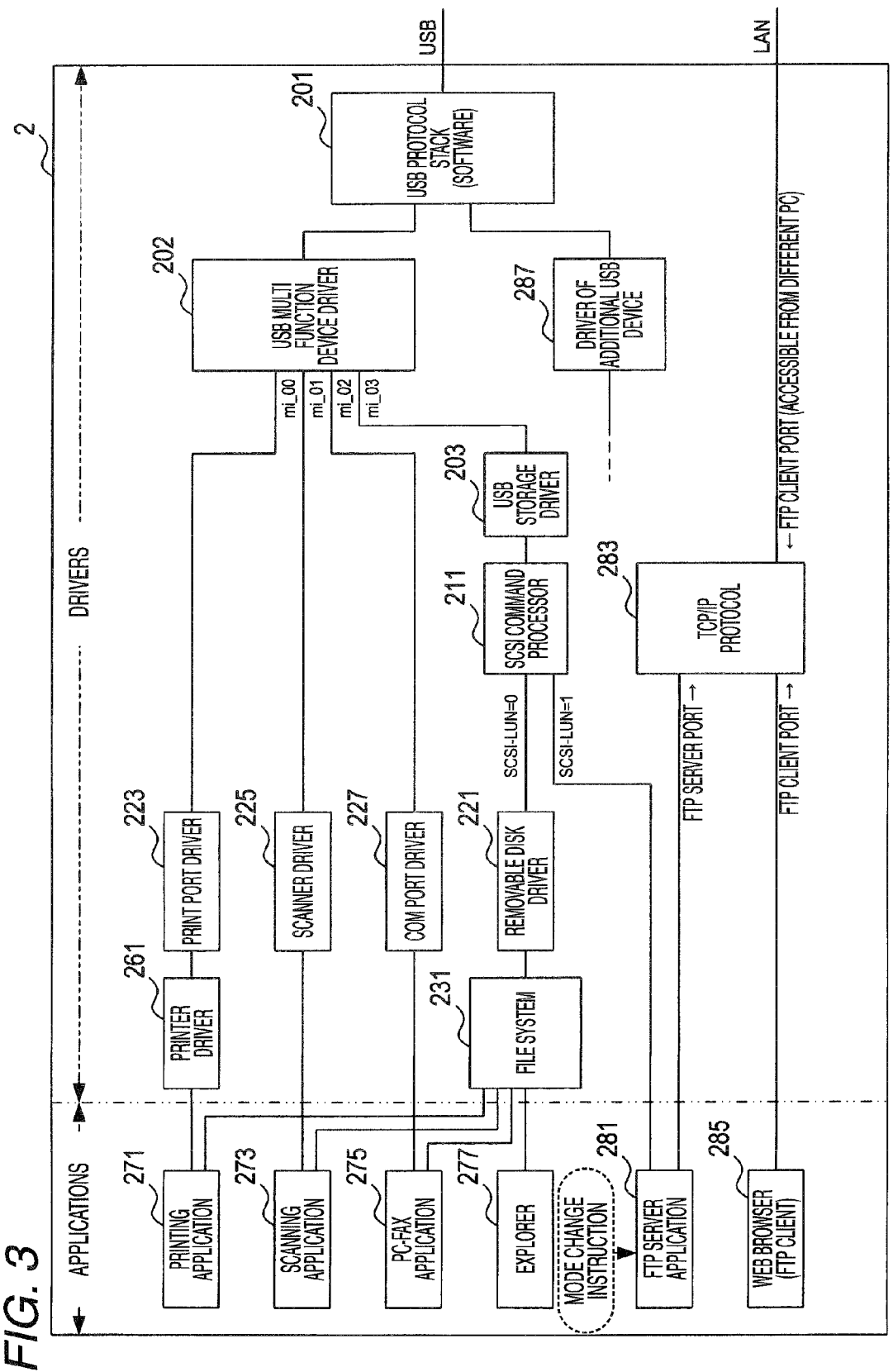
FIG. 3 is a block diagram showing the internal configuration of a PC.

FIG. 3 is a block diagram illustrating the internal configuration of the PC 2.

In the PC 2, as the standard functions based on the OS, a USB protocol stack 201, a USB multi function device driver 202, a USB storage driver 203, a SCSI command processor 211, a removable disk driver 221, and a file system 231 are operated.

In addition, in the PC 2, as exclusive-use software compliant with the multi function device 1, a print port driver 223, a scanner driver 225, a COM port driver 227, and a printer driver 261 are operated.

Furthermore, in the PC 2, as applications software using the functions, a printing application 271, a scanning application 273, and a PC-FAX application 275 are operated.

In this embodiment, as the OS in the PC 2, Windows (Registered Trademark) is used. Explorer 277, which is software comes with Windows (Registered Trademark), can operate on the PC 2. As the OS in the PC 2, an OS other than Windows (Registered Trademark) may be used insofar as the same functions can be implemented.

Furthermore, in the PC 2, an FTP server application 281 and a TCP/IP protocol 283 are operated. The FTP server application 281 is software that receives an access request from a WEB browser 285 which functions as an FTP client, and issues a file access request to the multi function device 1.

On the PC 2, a driver 287 of an additional USB device compliant with the additional USB device 4 can be operate.

(Outline of Multi Function Device and PC Functions)

The multi function device 1 can be switched to one of two modes according to a user's operation on the PC 2.

One mode is a USB storage mode (corresponding to a first mode; hereinafter, also referred to as "USB mode"). In this mode, an access from the PC 2 to a USB storage device is permitted.

In this case, the first memory slot 151, the second memory slot 152, the third memory slot 153, and the fourth memory slot 154 in the multi function device 1 function in the same manner as a usual USB storage device.

The other mode is an FTP server mode (corresponding to a second mode; hereinafter, also referred to as "FTP mode"). In this mode, an access from the PC 2 to a USB storage device is prohibited.

In this case, the first memory slot 151, the second memory slot 152, the third memory slot 153, and the fourth memory slot 154 in the multi function device 1 do not function in the same manner as a usual USB storage device. Specifically, even if a medium is mounted to any one of the memory slots 151 to 154, and the PC 2 tries to access the medium, the multi function device 1 only returns a response indicating that no medium is mounted.

However, when the multi function device 1 is switched to the FTP mode, an application compliant with the FTP mode may access the first memory slot 151, the second memory slot 152, the third memory slot 153, and the fourth memory slot 154 in the multi function device 1.

An application compliant with the FTP mode transmits a data string (a particular data string), which is different from a data string (a standard data string) to be transmitted from a usual USB storage device compliant application to the multi function device 1, to the multi function device 1. This will be described below in detail.

The multi function device 1 analyzes whether a data string which is transmitted from the PC 2 is a standard data string or a particular data string. If the data string is the standard data string, a processing is executed on the data string as a data string for the USB storage device. Specifically, the standard data string is transmitted to the physical sector unit input/output task 143, such that an access to the medium is executed in physical sector unit.

In contrast, if the data string is the particular data string, a different processing from the data string for the USB storage device is executed, and accordingly an access to each slot is achieved. Specifically, the particular data string is transmitted to the file unit input/output task 161, such that an access to the medium is executed in file unit through the file system task 163.

In the multi function device 1, a section for switching the device to one of the modes serves as an example of a mode switching section.

(Specification and Transmission Method of Standard Data String and Particular Data String)

Next, the specification and transmission method of the standard data string and the particular data string will be described.

In the multi function device 1, whether the data string is the standard data string or the particular data string is determined on the basis of the value of the LUN field (SCSI-LUN) in the SCSI command.

Specifically, when SCSI-LUN=0, it is determined that the data string is the standard data string for an access to the USB storage device. When SCSI-LUN-1, it is determined that the data string is the particular data string for an access to devices other than the USB storage device.

The value SCSI-LUN is a number for assigning a logical unit based on the SCSI standard. In other words, it means that the multi function device 1 is a device having two logical units based on the SCSI standard. One of the two logical units is a logical unit having a function corresponding to the USB storage device, and the other is an additional logical unit.

According to the USB standard, the OS in the PC 2 only recognizes the logical unit having a function corresponding to the USB storage device. For this reason, only exclusive-use software which has known an access method to the additional logical unit can access the additional logical unit.

In the multi function device 1, the logical unit corresponding to SCSI-LUN=0 is defined as a logical unit which is handled as a removable HD based on the SCSI standard. The logical unit corresponding to SCSI-LUN=1 is define as a logical unit which is handled as a communication device based on the SCSI standard.

Data transmission to the logical unit corresponding to SCSI-LUN=0 is performed in the same manner as the usual USB storage device. The data transmission method to the usual USB storage device is well known, and the description thereof will be omitted here.

Data transmission to the logical unit corresponding to SCSI-LUN=1 is performed by using the SCSI commands "GetMessage" and "SendMessage". In using "GetMessage" and "SendMessage", stream selection which is defined for each device based on the SCSI standard is defined as follows and used.

0x0100: File Access Command Output (ASCII Transfer)
0x0101: File Access Data Output (Binary Transfer)
0x0102: File Access Data Input (Binary Transfer)
0x0103: File Access Status Input (ASCII Transfer)

It is assumed that as for the file access data output and the file access data input, binary data is transferred as it is, and as for file access command output and the file access status input, one or a plurality of character strings are transferred. As for the file access command output and the file access status input, when a numeric value is to be transferred, the numeric value is converted into a character string.

When one or a plurality of character strings are transferred, the data structure is defined as follows.

(First Character String) [0x00] (Second Character String) [0x00] (Third Character String) [0x00]

That is, each character string is terminated by the null [0x00]. When the null [0x00] is present subsequent to the null [0x00] for terminating the character string, it means that all the character strings are terminated.

When one or a plurality of character strings are transferred, the number of character strings varies by file access command or file access status, but at least one character string is constantly present.

In the file access command output, a first character string expresses a file access command. As the first character string, for example, a character string, such as fopen, fread, fwrite, fseek, fclose, modeget, or modeset, is used.

In the file access command output, the second character string and subsequent character strings express parameters. For example, in case of fopen, the second character string is a file name and the third character string is an open mode. In case of fclose, the second character string is a handle number (numeric value converted into character string). These parameters are based on the standard functions in the C language.

In the file access status input, the first character string is one of "0" and "1". Here, "0" represents failure and "1" represents success. In the file access status input, the second character string and the subsequent character strings store return data other than the first character string.

For example, in case of fopen, if the first character string is "0 (failure)", the second character string is none, and if the first character string is "1 (success)", the second character string is a handle number (numeric value converted into character string). In case of fclose, the second character string is none.

In regards to the file access commands, one file access command is used in combination of two or three SCSI commands. The two or three SCSI commands are transmitted from the PC 2 to the multi function device 1, and response data to each SCSI command is transmitted from the multi function device 1 to the PC 2.

Specifically, a file access command having no mass data transmission (fopen, fseek, fclose, modeget, or modeset) is implemented with two SCSI commands of "SendMessage/Stream Selection 0x0100: File Access Command Output" and "GetMessage/Stream Selection 0x0103: File Access Status Input".

A file access command accompanied by mass data output (fwrite) is implemented with three SCSI commands of "SendMessage/Stream Selection 0x0100: File Access Command Output", "SendMessage/Stream Selection 0x0101: File Access Data Output", and "GetMessage/Stream Selection 0x0103; File Access Status Input".

A file access command accompanied by mass data output (fread) is implemented with three SCSI commands of "SendMessage/Stream Selection 0x0100: File Access Command Output", "GetMessage/Stream Selection 0x1002: File Access Data Input", and "GetMessage/Stream Selection 0x01033: File Access Status Input".

(Processing in SCSI Command Analysis Task)

Next, among the processing to be executed in the sections of the multi function device 1, a processing to be executed in the SCSI command analysis task 141 of the multi function device 1 will be described with reference to FIG. 4.

If this processing starts, the multi function device 1 first determines whether or not a SCSI command is input from the PC 2 (S105). Here, if a SCSI command is not input from the PC 2 (S105: Not Input), the process returns to S105.

If a SCSI command is input from the PC 2 (S105: Input), it is determined whether the value of an LUN field (SCSI-LUN) in the SCSI command is "0" or "1" (S110).

When it is determined in S110 that SCSI-LUN is "0" (S110: SCSI-LUN=0), the multi function device 1 transmits the SCSI command to the physical sector unit input/output task 143, and waits for until a processing in the physical sector unit input/output task 143 is completed (S115).

In S115, the SCSI command which is transmitted from the PC 2 is then transmitted from the SCSI command analysis task 141 to the physical sector unit input/output task 143. In S115, after the SCSI command is transmitted to the physical sector unit input/output task 143, the multi function device 1 waits for until the processing in the physical sector unit input/output task 143 is completed.

When the processing in the physical sector unit input/output task 143 is completed, the physical sector unit input/output task 143 returns a response. Therefore, in S115, the response from the physical sector unit input/output task 143 is transmitted to the PC 2, and S115 is ended. If S15 is ended, the process returns to S105.

A detailed description will be given for S115 by ways of a specific example. There is a case where a SCSI command requesting to write data to a medium (in this embodiment, a memory card) is transmitted from the PC 2. In this case, in S115, the SCSI command which is received by the SCSI command analysis task 141 is transmitted to the physical sector unit input/output task 143.

At this time, a predetermined processing (the details will be described below) is executed in the physical sector unit input/output task 143. Then, information about the execution result of the predetermined processing is returned from the physical sector unit input/output task 143 to the SCSI command analysis task 141 as a response.

In S115, the SCSI command analysis task 141 waits for until the processing in the physical sector unit input/output task 143 is completed. Then, when receiving the response from the physical sector unit input/output task 143, the SCSI command analysis task 141 returns the response to the PC 2 as a response to the SCSI command, and S115 is ended.

There is also a case where a SCSI command requesting to read data from the medium is transmitted from the PC 2. In this case, in S115, the SCSI command which is received by the SCSI command analysis task 141 is transmitted to the physical sector unit input/output task 143.

At this time, a predetermined processing (the details will be described below) is executed in the physical sector unit input/output task 143. Then, information about the execution result of the predetermined processing or read data is returned from the physical sector unit input/output task 143 to the SCSI command analysis task 141 as a response.

In S115, the SCSI command analysis task 141 waits for until the processing in the physical sector unit input/output task 143 is completed. Then, when receiving the response from the physical sector unit input/output task 143, the SCSI command analysis task 141 returns the response to the PC 2 as a response to the SCSI command, and S115 is ended.

Although various other SCSI commands exist, in S115, any SCSI command is transmitted from the SCSI command analysis task 141 to the physical sector unit input/output task 143. Thereafter, the response which is returned from the physical sector unit input/output task 143 to the SCSI command analysis task 141 is transmitted to the PC 2.

As described above, since there are various SCSI commands are transmitted from the PC 2 to the physical sector unit input/output task 143, the contents of the processing to be executed by the physical sector unit input/output task 143 vary according to the SCSI commands.

When it is determined in S110 that SCSI-LUN is "1" (S110: SCSI-LUN=1), the multi function device 1 transmits the SCSI command to the file unit input/output task 161, and waits for until a processing in the file unit input/output task 161 is completed (S120).

In S120, the SCSI command which is transmitted from the PC 2 is then transmitted from the SCSI command analysis task 141 to the file unit input/output task 161. In S120, after the SCSI command is transmitted to the file unit input/output task 161, the multi function device 1 waits for until the processing in the file unit input/output task 161 is completed.

When the processing in the file unit input/output task 161 is completed, the file unit input/output task 161 returns a response. Therefore, in S120, the response from the file unit input/output task 161 is transmitted to the PC 2, and S120 is ended. If S120 is ended, the process returns to S105.

(Processing in Physical Sector Unit Input/Output Task)

Next, a processing to be executed in the physical sector unit input/output task 143 of the multi function device 1 will be described on the basis of FIGS. 5 and 6.

If this processing starts, the multi function device 1 first determines whether or not a SCSI command is input from the SCSI command analysis task 141 (S205). If a SCSI command is input from the SCSI command analysis task 141 (S205: Input), it is determined whether or not the SCSI command is a command which requires an access to a medium (S210).

When the SCSI command is the command which requires to access the medium (S210: Yes), it is determined whether or not the right of use of the memory slot control task 145 is currently being acquired (S215). The right of use of the memory slot control task 145 is the right that the physical sector unit input/output task 143 and the file system task 163 can exclusively acquire. Only when acquiring the right of use, the physical sector unit input/output task 143 and the file system task 163 can access the memory slot control task 145. Accordingly, it is configured such that both can simultaneously perform data transmission with respect to the memory slot control task 145.

In S215, when it is determined that the right of use of the memory slot control task 145 is not being acquired (S215: No), subsequently, it is determined whether or not the current mode is the USB mode (S220). A section for executing S220 serves as an example of a mode determination section.

In S220, when the current mode is the USB mode (S220: Yes), the right of use of the memory slot control task 145 is acquired (S225). The right of use of the memory slot control task 145 may be successfully acquired or not depending on the conditions. Therefore, if S225 is ended, it is determined whether or not the right of use of the memory slot control task 145 is successfully acquired (S230).

When the right of use is not successfully acquired (S230: No), it is considered that the right of use of the memory slot control task 145 is acquired by the file system task 163. In this case, therefore, as a processing corresponding to the SCSI command transmitted from the SCSI command analysis task 141, a processing to return only a pseudo response corresponding to a case in which no medium is mounted is executed (S235), and then the process returns to S205. A section for executing S235 serves as an example of a pseudo response section.

In S220, when the current mode is not the USB mode (S220: No), an access to the USB storage device is prohibited. In this case, therefore, the process proceeds to S235 while skipping S225 and S230.

In this case, as a processing corresponding to the SCSI command transmitted from the SCSI command analysis task 141, a processing to return only a pseudo response corresponding to a case in which no medium is mounted is executed (S235), and then the process returns to S205.

Figure 7:
FIG. 7 is an explanatory view of a dialog to be displayed on the PC when no medium is mounted.

If the response corresponding to a case in which no medium is mounted is returned to the PC 2, the PC 2 displays a dialog as shown in FIG. 7. Therefore, the user can understand that an access to the USB storage device is impossible.

Meanwhile, in S230, when the right of use of the memory slot control task 145 is successfully acquired (S230: Yes), the process proceeds to S240. In S215, when it is determined that the right of use of the memory slot control task 145 is currently being acquired (S215: Yes), the process also proceeds to S240.

When the process proceeds to S240, a timer until the right is released is cleared (S240), and the SCSI command is executed (S245). In S245, a processing corresponding to the SCSI command transmitted from the SCSI command analysis task 141 is executed.

Specifically, for example, if the SCSI command is a command requesting to read data from the medium, in S245, an instruction command to read data from the medium is transmitted from the physical sector unit input/output task 143 to the memory slot control task 145.

When receiving the instruction, the memory slot control task 145 reads data in physical sector unit from the medium mounted to one of the first memory slot 151, the second memory slot 152, the third memory slot 153, and the fourth memory slot 154.

Data is then returned from the memory slot control task 145 to the physical sector unit input/output task 143. Then, the physical sector unit input/output task 143 returns data, which is transmitted from the memory slot control task 145, to the SCSI command analysis task 141.

When the SCSI command is a command requesting to write data to the medium, in S245, an instruction to write data to the medium is transmitted from the physical sector unit input/output task 143 to the memory slot control task 145.

When receiving the instruction, the memory slot control task 145 writes data in physical sector unit to the medium mounted to one of the first memory slot 151, the second memory slot 152, the third memory slot 153, and the fourth memory slot 154.

Data about the writing result is returned from the memory slot control task 145 to the physical sector unit input/output task 143. Then, the physical sector unit input/output task 143 returns data, which is transmitted from the memory slot control task 145, to the SCSI command analysis task 141.

Figure 6:
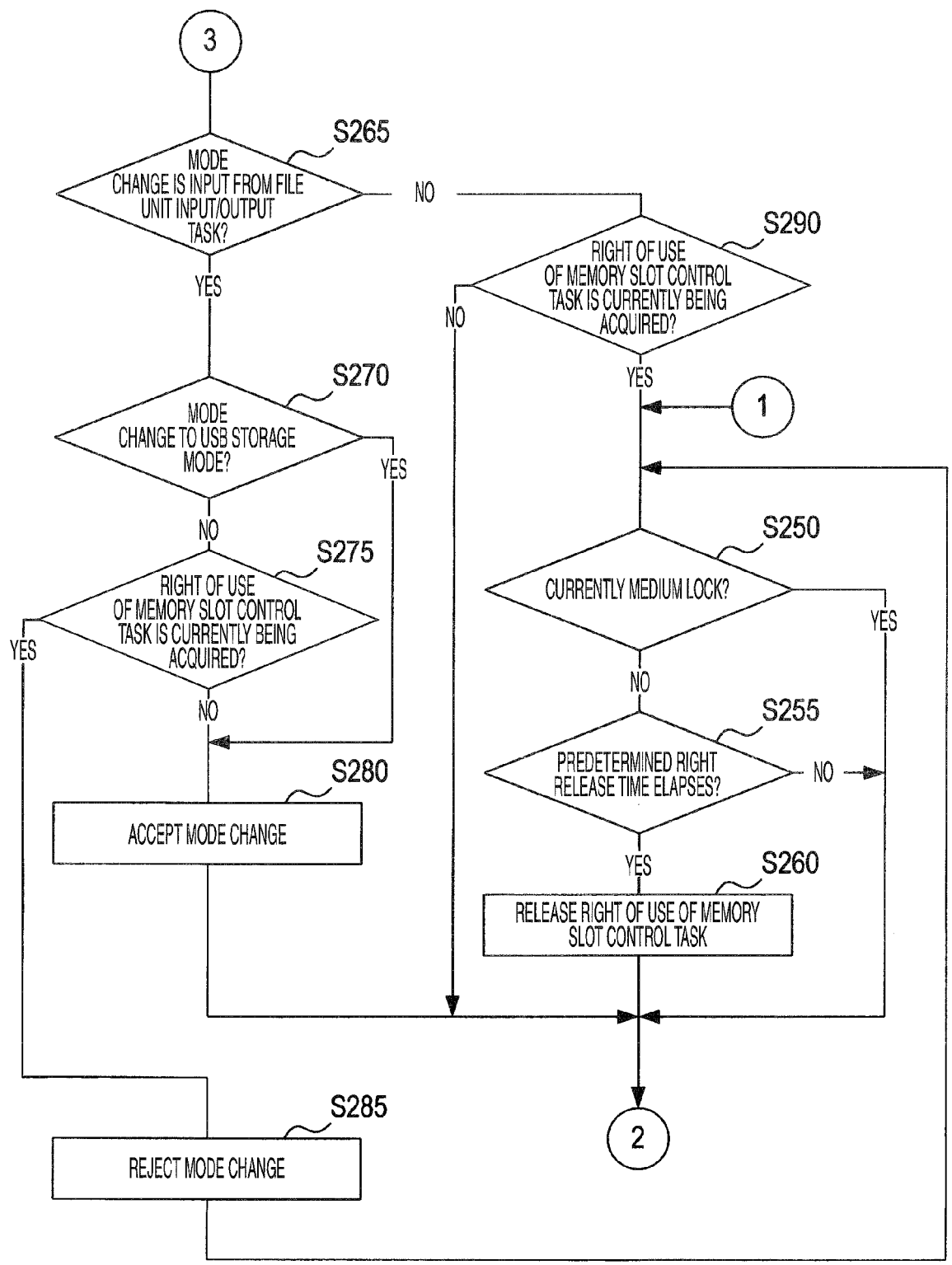
FIG. 6 is a flowchart of a second processing to be executed in the physical sector unit input/output task.

In this way, if S245 is ended, subsequently, as shown in FIG. 6, it is determined whether or not it is currently in a medium lock state (S250). When it is not in the medium lock state (S250: No), it is determined whether or not a predetermined right release time elapses (S255). Then, if the predetermined right release time elapses (S255: Elapsed), the right of use of the memory slot control task 145 is released (S260).

In S250 to S260, the medium lock is set on the basis of an instruction from the PC 2. Therefore, when it is in the medium lock, the PC 2 may execute a processing on an assumption that the medium is not removed.

The predetermined right release time is set to maintain the right of use of the memory slot control task 145 until a predetermined time elapses after the last access request is input from the PC 2. This is set because, even if the medium lock is released, an access request to the medium may be input from the PC 2 due to delayed write control in the PC 2.

Therefore, in S250 to S260, only when the medium lock is released and the predetermined right release time elapses, the right of use of the memory slot control task 145 is released.

Meanwhile, when it is currently in the medium lock state (S250: Yes), or when the predetermined right release time does not elapse (S255: Not Elapsed), S260 is skipped, and the right of use of the memory slot control task 145 is maintained.

Figure 5:
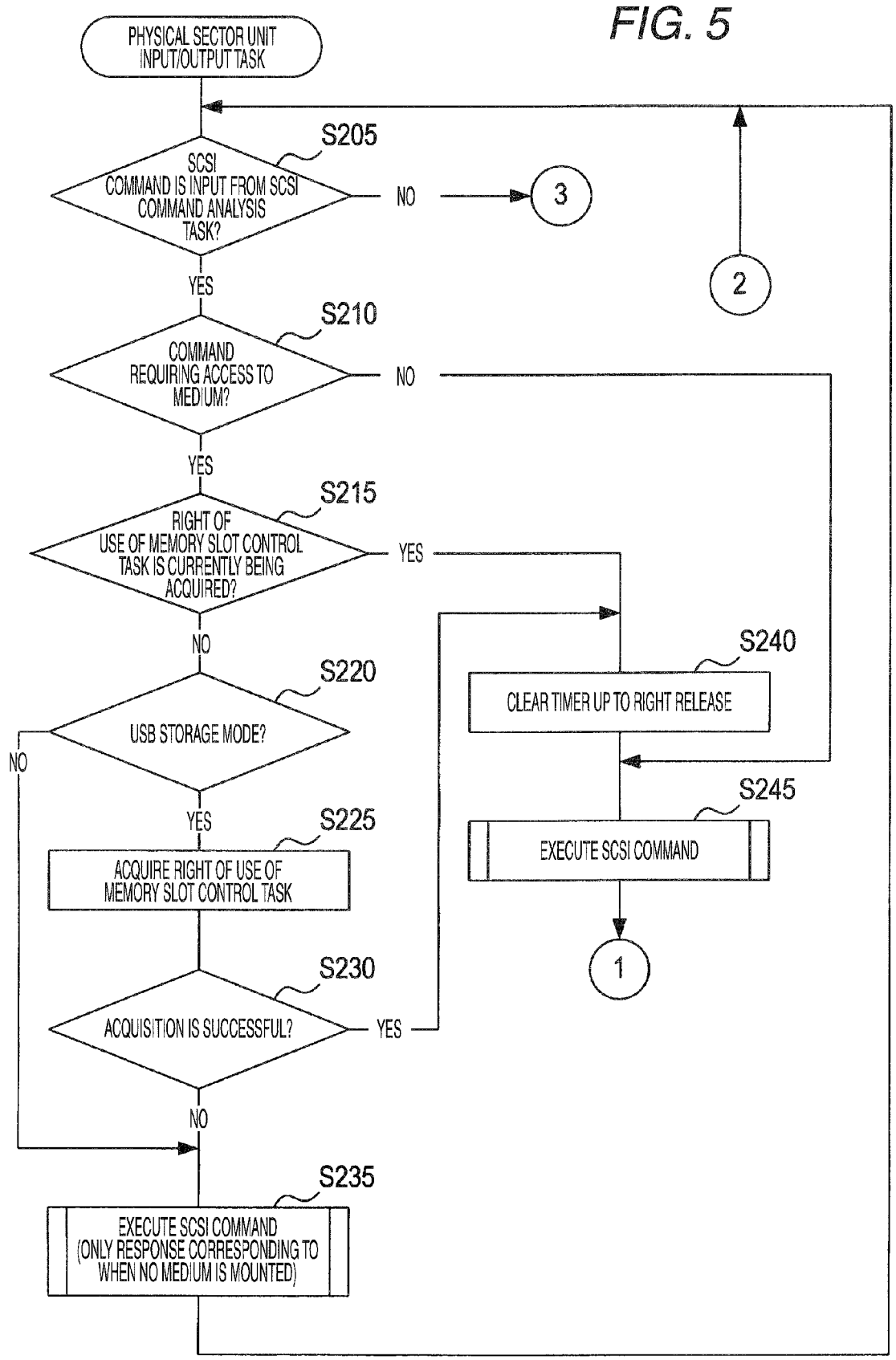
FIG. 5 is a flowchart of a first processing to be executed in a physical sector unit input/output task.

If S250 to S260 are ended, the process returns to S205 (see FIG. 5).

The foregoing description is for a processing when it is determined in S205 that the SCSI command is input. Meanwhile, in S205, it may be determined that no SCSI command is input from the SCSI command analysis task 141 (S205: Not Input).

In this case, the process proceeds to S265 shown in FIG. 6, and it is determined whether or not a mode change request is input from the file unit input/output task 161 (S265). The mode change request is issued during the processing which is executed in the file unit input/output task 161. This processing will be described below in detail.

In S265, when it is determined that the mode change request is input (S265; Input), it is determined to whether or not the mode change to the USB mode is requested (S270). In S270, when the mode change to the USB mode is not requested (S270: No), it means that the mode change to the FTP mode is requested.

Then, the physical sector unit input/output task 143 determines whether or not the right of use of the memory slot control task 145 is currently being acquired (S275).

In S275, when the right of use of the memory slot control task 145 is not being acquired (S275: No), the mode change to the FTP mode is possible. In addition, in S270, when the mode change to the USB mode is requested (S270: Yes), the mode change to the USB mode is possible.

In these cases, the mode change is accepted (S280), and the process returns to S205 (see FIG. 5). Accordingly, the mode change to the FTP mode or the USB mode is executed.

Meanwhile, in S275, when the right of use of the memory slot control task 145 is being acquired (S275: Yes), an access from the PC 2 may be continuously received, and thus the mode change to the FTP mode is impossible.

In this case, the mode change is rejected (S285). If S285 is ended, the process proceeds to S250. S250 and later have already been described, and the description be omitted here.

(Processing in File Unit Input/Output Task)

Next, a processing to be executed in the file unit input/output task 161 of the multi function device 1 will be described with reference to FIGS. 8 and 9.

If this processing starts, the multi function device 1 first determines whether or not a SCSI command is input from the SCSI command analysis task 141 (S305). Here, when a SCSI command is not input from the SCSI command analysis task 141 (S305: Not Input), the process returns to S305.

If a SCSI command is input from the SCSI command analysis task 141 (S305; Input), it is determined whether or not the SCSI command is "SendMessage/Stream Selection 0x0100" (S310). When the SCSI command is not "SendMessage/Stream Selection 0x0100 (S310: No), the process returns to S305.

When the SCSI command is "SendMessage/Stream Selection 0x0100" (S310: Yes), a group of command character strings which are transmitted from the SCSI command analysis task 141 are received (S315). Then, on the basis of the first character string among the group of command character strings, it is determined whether the SCSI command is a file access command in which file access data output is successively input (S320).

When it is determined in S320 that the SCSI command is a command in which the file access data output exists (S320: Yes), it waits for until "SendMessage/Stream Selection 0x0101" is input (S325: Wait). Then, if "SendMessage/Stream Selection 0x0101" is input (S325: Input), data is received (S330), and the process proceeds to S335.

In S320, when it is determined that the SCSI command is not a command in which the file access data output exists (S320: No), S325 and S330 are skipped, and the process proceeds to S335.

In this way, when the process proceeds to S335, the command of the first character string among the group of character strings is executed (S335). S335 will be shown in FIG. 9 in detail.

That is, the multi function device 1 first determines the first character string (S405). A section for executing S405 serves as an example of a file access request determination section and a mode switching request determination section.

In S405, when the first character string is fopen or fclose (S405: fopen/fclose), a function fopen( ) or fclose( ) is called (S410). Accordingly, the file unit input/output task 161 can open or close a file through the file system task 163.

In S405, when the first character string is fread or fwrite (S405: fread/fwrite), a function fread( ) or fwrite( ) is called (S415). Accordingly, the file unit input/output task 161 can read and write a file through the file system task 163.

In S405, when the first character string is modeget (S405: modeget), the current mode is acquired (S420). The mode to be acquired in S420 is one of the USB mode and the FTP mode.

In S405, when the first character string is modeset (S405: modeset), the physical sector unit input/output task 143 is requested for the mode change (S425). A request issued to the physical sector unit input/output task 143 in S425 is to be determined in S265.

If S410 to S425 are ended, data or status as the processing result is set in a buffer for GetMessage (S430). Therefore, it waits for until data set in the buffer is extracted from the PC 2.

Figure 8:
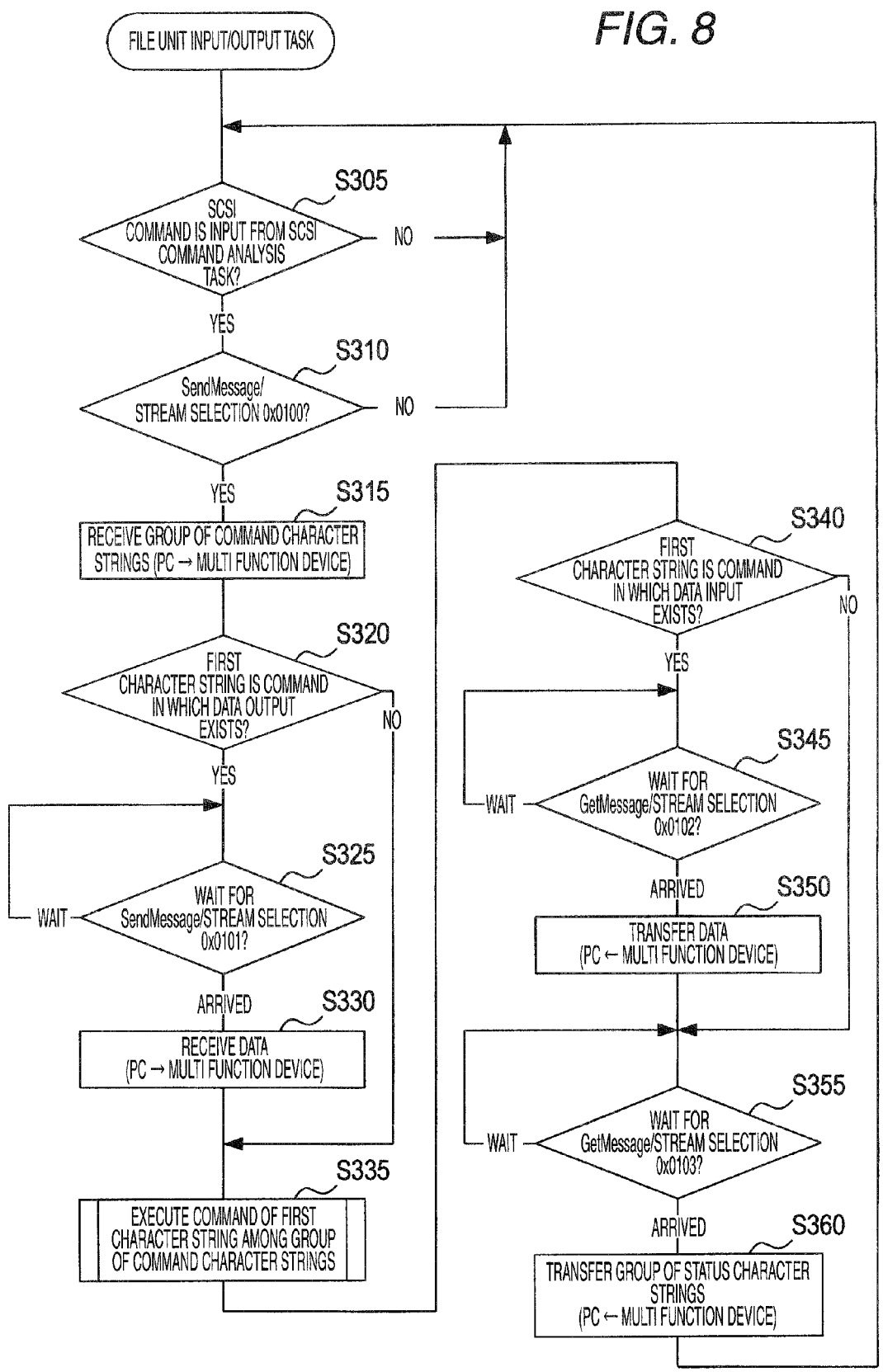
FIG. 8 is a flowchart of a first processing to be executed in a file unit input/output task.
Figure 9:
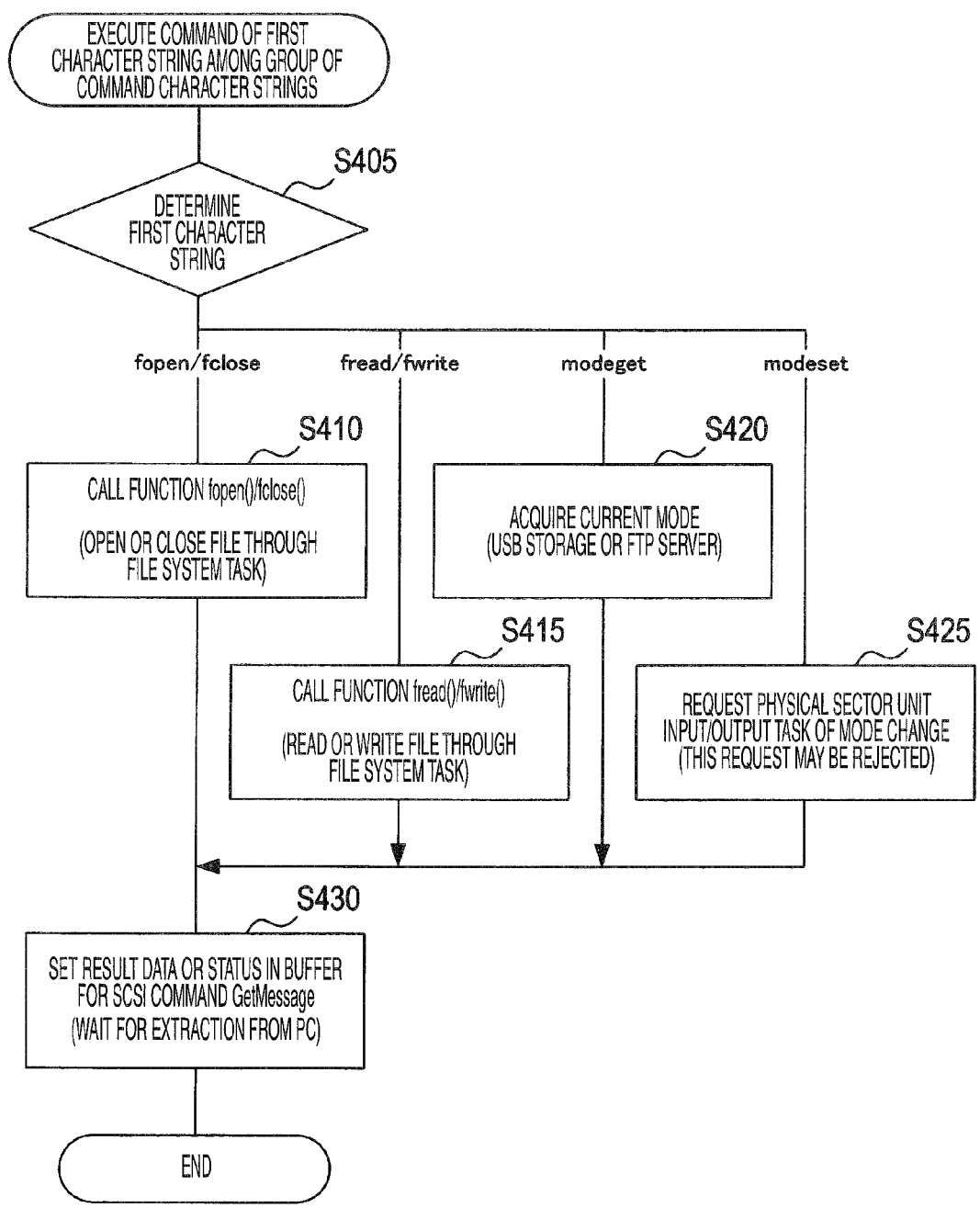
FIG. 9 is a flowchart of a second processing to be executed in the file unit input/output task.

If S405 to S430 are ended, S335 shown in FIG. 8 is ended, and subsequently, on the basis of the first character string, it is determined whether or not the SCSI command is a file access command in which file access data input exists (S340).

When it is determined in S340 that the SCSI command is a command in which file access data input exists (S340: Yes), it waits for until "GetMessage/Stream Selection 0x0102" is input (S345: Wait). Then, if "GetMessage/Stream Selection 0x0102" is input (S345: Input), data is transmitted from the multi function device 1 to the PC 2 (S350), and the process proceeds to S355.

When it is determined in S340 that the SCSI command is not a command in which file access data input exists (S340: No), S345 and S350 are skipped, and the process proceeds to S355.

In this way, if the process proceeds to S355, it waits for until "GetMessage/Stream Selection 0x0103" is input (S355: Input). Then, if "GetMessage/Stream Selection 0x0103" is input (S355: Input), a group of status character strings are transmitted from the multi function device 1 to the PC 2 (S360), and the process returns to S305.

(Processing in File System Task of Multi Function Device)

Figure 10:
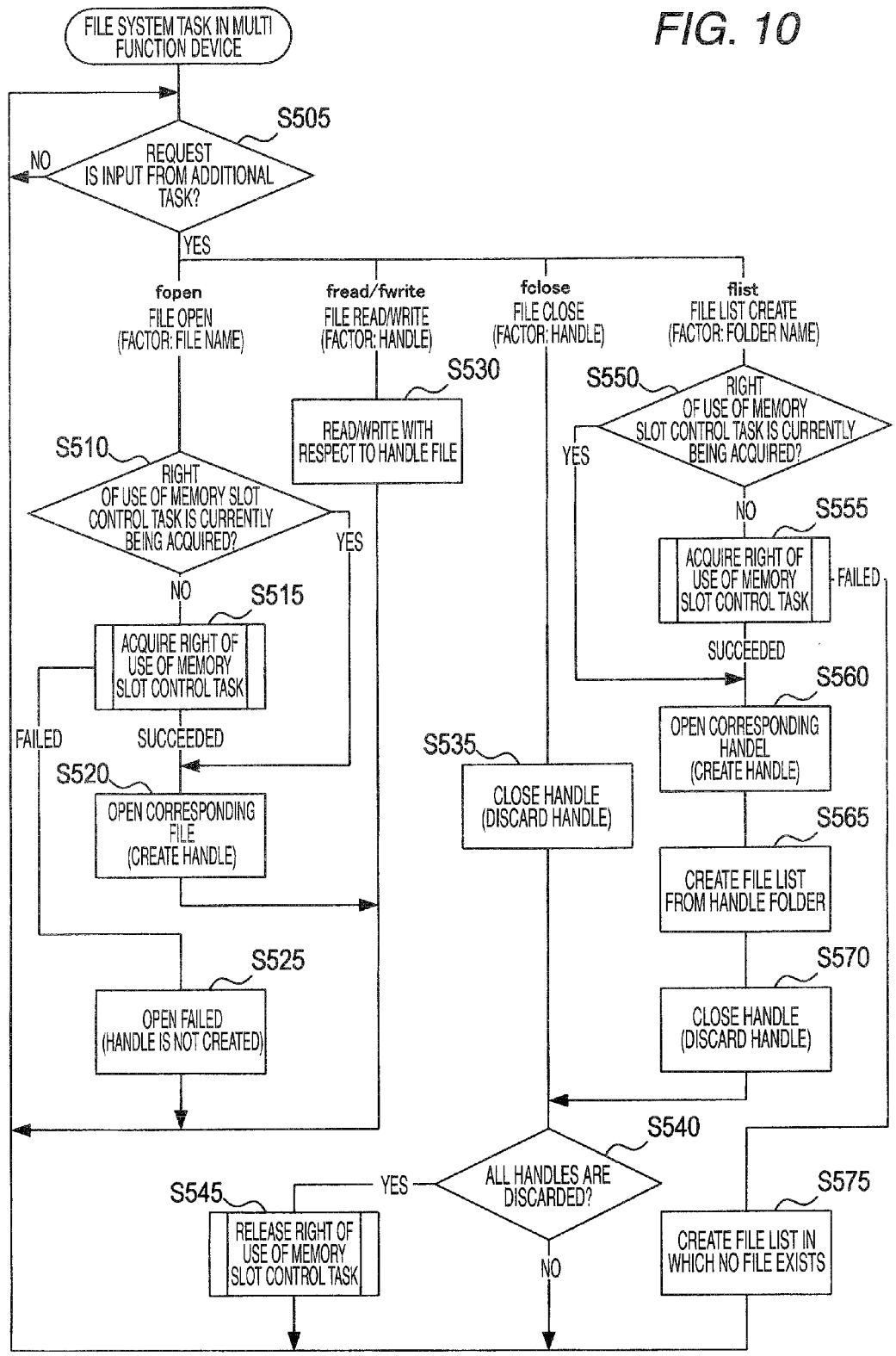
FIG. 10 is a flowchart of a processing to be executed in a file system task of the multi function device.

Next, a processing to be executed in the file system task 163 of the multi function device 1 will be described with reference to FIG. 10.

If this processing starts, the multi function device 1 first determines whether or not a file access related request is input from an additional task (S505). Specific examples of the additional task include, for example, the file unit input/output task 161, the medium print function 171, and the FTP server task 173.

In addition to these additional tasks, a task that issues a request to the file system task 163 may exist according to the functions installed in the multi function device 1.

In S505, when no request is input from the additional task (S505: Not Input), the process returns to S505. When a request is input from the additional task (S505: Yes) and if the request is fopen (S505: fopen), it is determined whether or not the right of use of the memory slot control task 145 is currently being acquired (S510).

As described above, the right of use of the memory slot control task 145 is the right that can be exclusively acquired by the physical sector unit input/output task 143 and the file system task 163.

When it is determined in S510 that the right of use of the memory slot control task 145 is not being acquired (S510: No), the right of use of the memory slot control task 145 is acquired (S515). The right of use of the memory slot control task 145 may be acquired or not depending on the conditions.

When the right of use is successfully acquired (S515: Successful) or when the right of use has already been acquired (S510: Yes), a file open processing is executed (a handle is created) (S520), and the process returns to S505.

When the right of use is not successfully acquired (S515: Failure), it is considered that the right of use of the memory slot control task 145 is acquired by the physical sector unit input/output task 143. Therefore, the file is not successfully opened (S525). In this case, no handle is created, and the process returns to S505.

In S505, when the request from the additional task is fread or fwrite (S505: fread/fwrite), a handle file is read (S530), and the process returns to S505.

In S505, when the request from the additional task is fclose (S505: fclose), a handle close processing is executed (handle is discarded) (S535). Then, it is determined whether or not all handles are discarded (S540).

When it is determined in S540 that all the handles are discarded (S540: Yes), the right of use of the memory slot control task 145 is released (S545), and the process returns to S505. When it is determined that there is an undiscarded handle (S540: No), S545 is skipped, and the process returns to S505.

In S505, when the request from the additional task is flist (S505: flist), it is determined whether or not the right of use of the memory slot control task 145 is currently being acquired (S550).

When it is determined in S550 that the right of use of the memory slot control task 145 is not being acquired (S550: No), the right of use of the memory slot control task 145 is acquired (S555). The right of use of the memory slot control task 145 may be acquired or not depending on the conditions.

When the right of use is successfully acquired (S555: Success) or when the right of use has already been acquired (S550: Yes), a file open processing is executed (a handle is created) (S560).

Then, a file list is created from a handle folder (S565), and a handle close processing is executed (handle is discarded) (S535). If S570 is ended, the process proceeds to S540. S540 and later have already been described, and the description will be omitted here.

In S555, when the right of use is not successfully acquired (S555: Failure), a file list in which no file exists is created (S575), and the process returns to S505.

(Processing in Medium Print Function of Multi Function Device)

Next, a processing to be executed in the medium print function 171 of the multi function device 1 will be described with reference to FIG. 11.

If this processing starts, the multi function device 1 first creates a file list in a root directory of the card (S605). In S605, by calling a function flist( ), an access to a file on the memory card is executed through the medium print function 171.

Next, on the basis of the file list in the root directory, it is determined whether or not a subdirectory exists. When a subdirectory exists, as for the subdirectory, a file list is created (S610). In S610, by calling the function flist( ), an access to a file on the memory card is executed through the medium print function 171. S610 is executed on all the subdirectories.

Next, an image file is extracted from the file list obtained in S605 and S610 (S615), and it is determined whether or one or more image files are extracted (S620). When no image file exists (S620: Absence), a message, "No image file exists in the card" is displayed on the display section of the multi function device 1 (S625), and the processing shown in FIG. 11 is ended.

When it is determined in S620 that one or more image files exist (S620: Presence), the thumbnails of the image files are created (S630). In S630, the functions fopen( ), fread( ), and fclose( ) are called, and an access to a file on the memory card (read the image file) is executed through the medium print function 171. Then, the read image file is thumbnailed.

Next, an image file in the card is displayed on the display section of the multi function device 1 (S635). In S635, the file name of the image file and the thumbnail created in S630 are displayed in pair on the display section of the multi function device 1.

Thereafter, the multi function device 1 waits for the user' input, and at this time, the user can select an image file to be printed (S640). In this state, when the user makes a cancel operation (S640: Cancel), the processing shown in FIG. 11 is ended.

In S640, when the user selects an image file and inputs an instruction to start printing (S640: Selection and Print Start), the multi function device 1 reads the image file to be printed (S645). In S645, the functions fopen( ), fread( ), and fclose( ) are called, and an access to a file on the memory card (read the image file) is executed through the medium print function 171.

Figure 11:
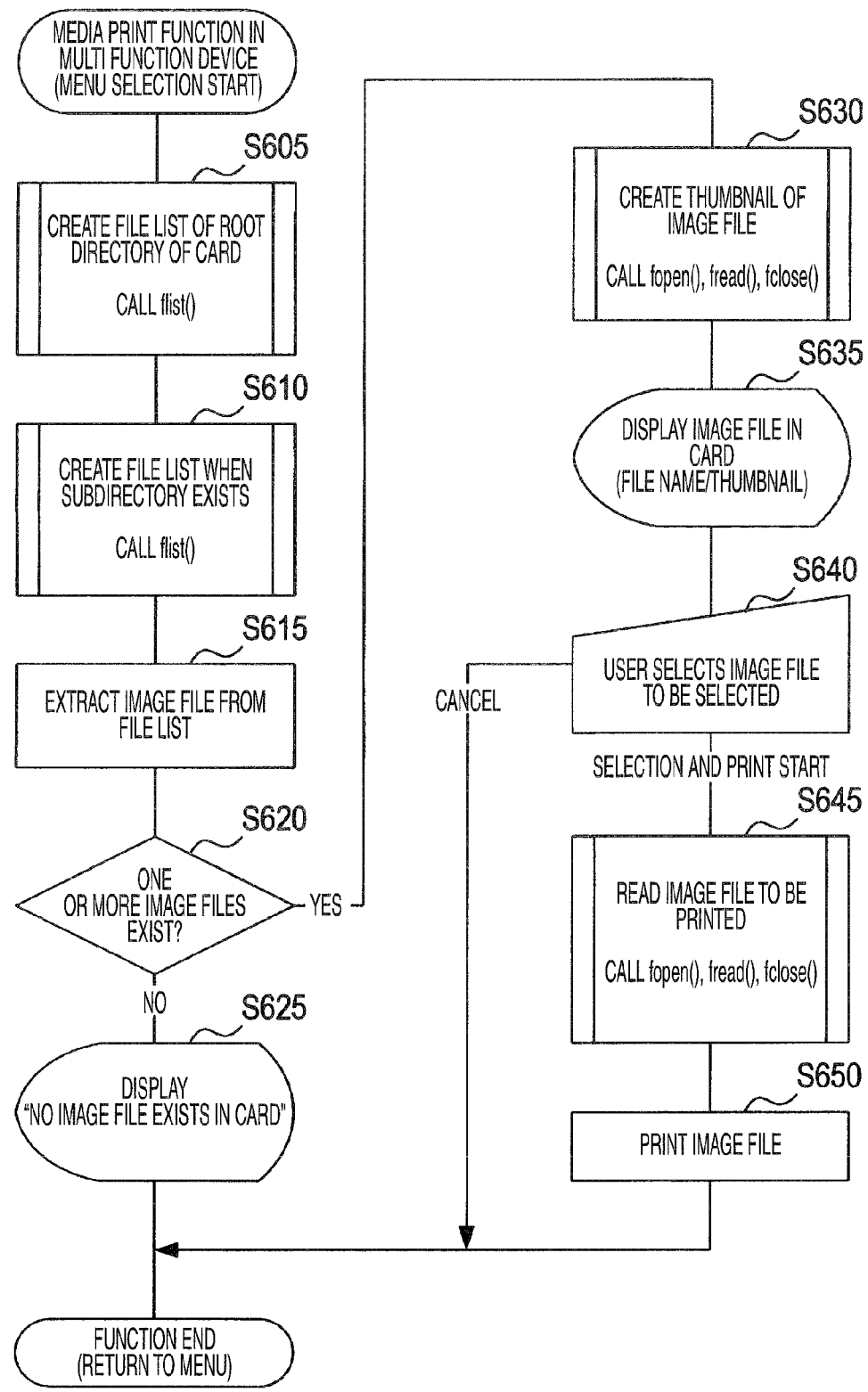
FIG. 11 is a flowchart of a processing to be executed in a medium print function of the multi function device.

Then, the image file read from the card is printed (S650), and the processing shown in FIG. 11 is ended.

(Processing to be Executed When FTP server application serving as PC is Activated)

Next, a processing to be executed when the FTP server application 281 serving as the PC 2 is activated will be described with reference to FIG. 12.

The FTP server application 281 may be activated with any timing, but when the function can be constantly used, it may be set to be activated when the PC 2 is activated.

If the FTP server application 281 is activated and this processing starts, the PC 2 executes modeget (S705). Specifically, the SCSI commands "SendMessage/Stream Selection 0x0100: File Access Command Output" and "GetMessage/ Stream Selection 0x0103: File Access Status Input" are issued with SCSI-LUN=1 assigned, such that the multi function device 1 is requested to execute the modeget command.

Figure 4:
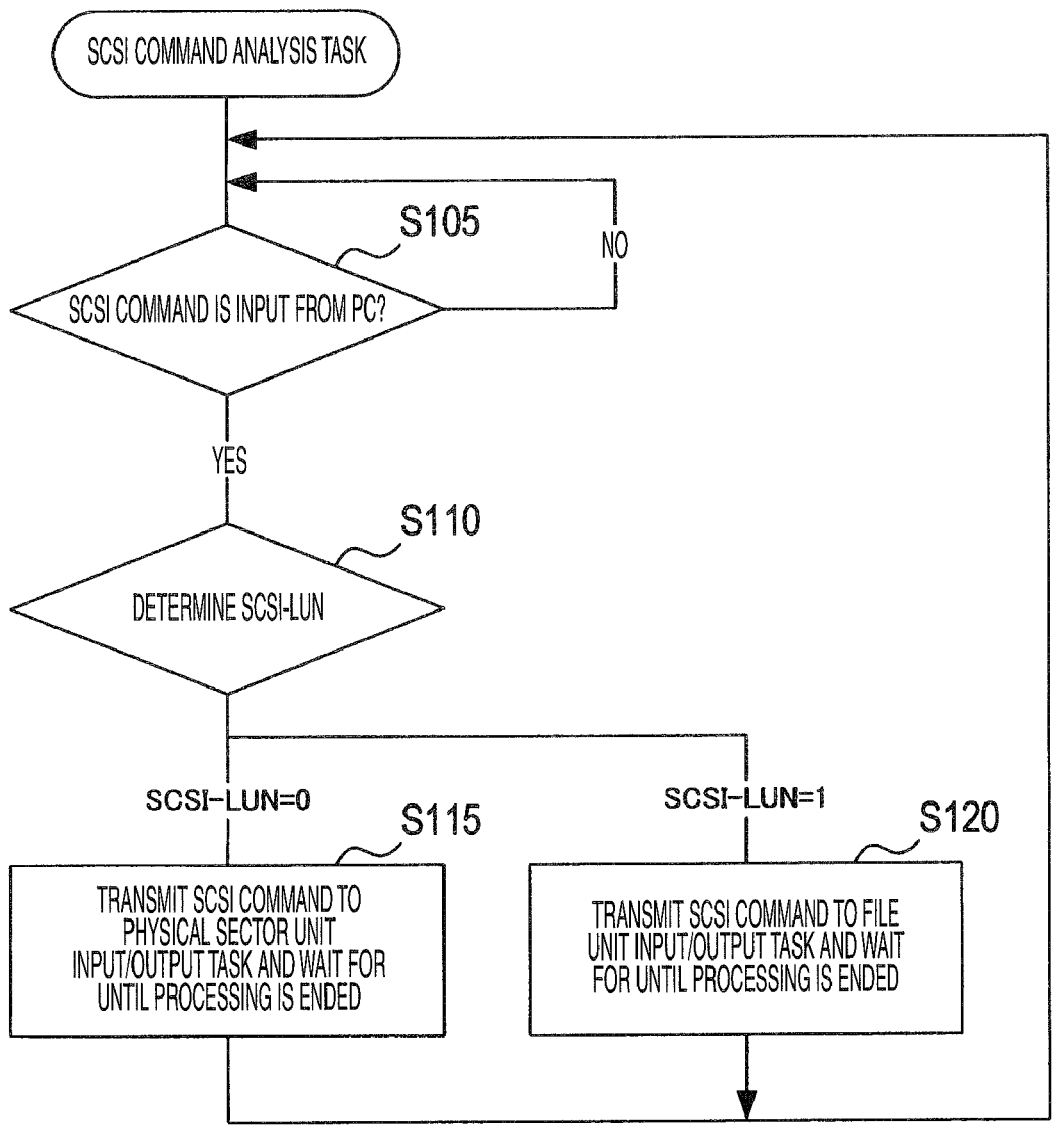
FIG. 4 is a flowchart of a processing to be executed in a SCSI command analysis task.

If the request to execute the modeget command is transmitted to the multi function device 1, the SCSI command analysis task 141 distributes the SCSI command into the file unit input/output task 161 by the processing shown in FIG. 4. Next, the file unit input/output task 161 executes a processing (see S420) corresponding to modeget by the processing shown in FIGS. 5 and 9. In S430, the current mode is set in the buffer for GetMessage.

Next, in S360, data set in the buffer for GetMessage is transmitted to the PC 2. As a result, the PC 2 acquires the current mode of the multi function device 1.

In this way, if the mode of the multi function device 1 is acquired, the mode is stored (S710) and it is determined whether or not the mode change to the FTP mode is set when the FTP server application is activated (S715). The user may arbitrarily set whether or not to switch the device to the FTP mode when the FTP server application is activated. How the mode change is set is stored in a setup file for the FTP server application.

When the mode change to the FTP mode is set (S715: Yes), it is determined whether or not the current mode of the multi function device 1 (the mode acquired in S705 and stored in S710) is the FTP mode (S720).

When the current mode is not the FTP mode (S720: No), the PC 2 executes modeset (S725). Specifically, the SCSI commands "SendMessage/Stream Selection 0x0100: File Access Command Output" and "GetMessage/Stream Selection 0x0103: File Access Status Input" are issued with SCSI-LUN=1 assigned, such that the multi function device 1 is requested to execute the modeset command.

If the request to execute the modeset command is transmitted to the multi function device 1, the SCSI command analysis task 141 distributes the SCSI command into the file unit input/output task 161 by the processing shown in FIG. 4. Next, the file unit input/output task 161 executes a processing (see S425) corresponding to modeset by the processing shown in FIGS. 8 and 9. Therefore, S270 to S285 are executed in the physical sector unit input/output task 143.

In S430, information about whether or not the mode change is successful is set in the buffer for GetMessage. Next, in S360, data set in the buffer for GetMessage is transmitted to the PC 2. As a result, the PC 2 acquires the information about whether or not the mode change is successful.

Next, the PC 2 determines whether or not the mode change is successful (S730). When the mode change is successful (8730: Yes), the current mode of the multi function device 1 is stored as the FTP mode (S735), and then the process proceeds to S740.

When it is determined in S715 that the mode change to the FTP mode is not set (S715: No) or when it is determined in S720 that the current mode is the FTP mode (S720: Yes), it is not necessary to perform the mode change. In this case, therefore, S725 to S735 are skipped, and the process proceeds to S740.

In S730, when the mode change is failed (S730: No), a failure in the mode change is displayed for a predetermined time (S737), and then the process proceeds to S740.

If the process proceeds to S740, a task tray icon based on the current mode of the multi function device 1 is determined (S740), an FTP server thread is activated, and a FTP server port of the TCP/IP is opened (S745). Thus, the processing shown in FIG. 12 is ended.

Figure 12:
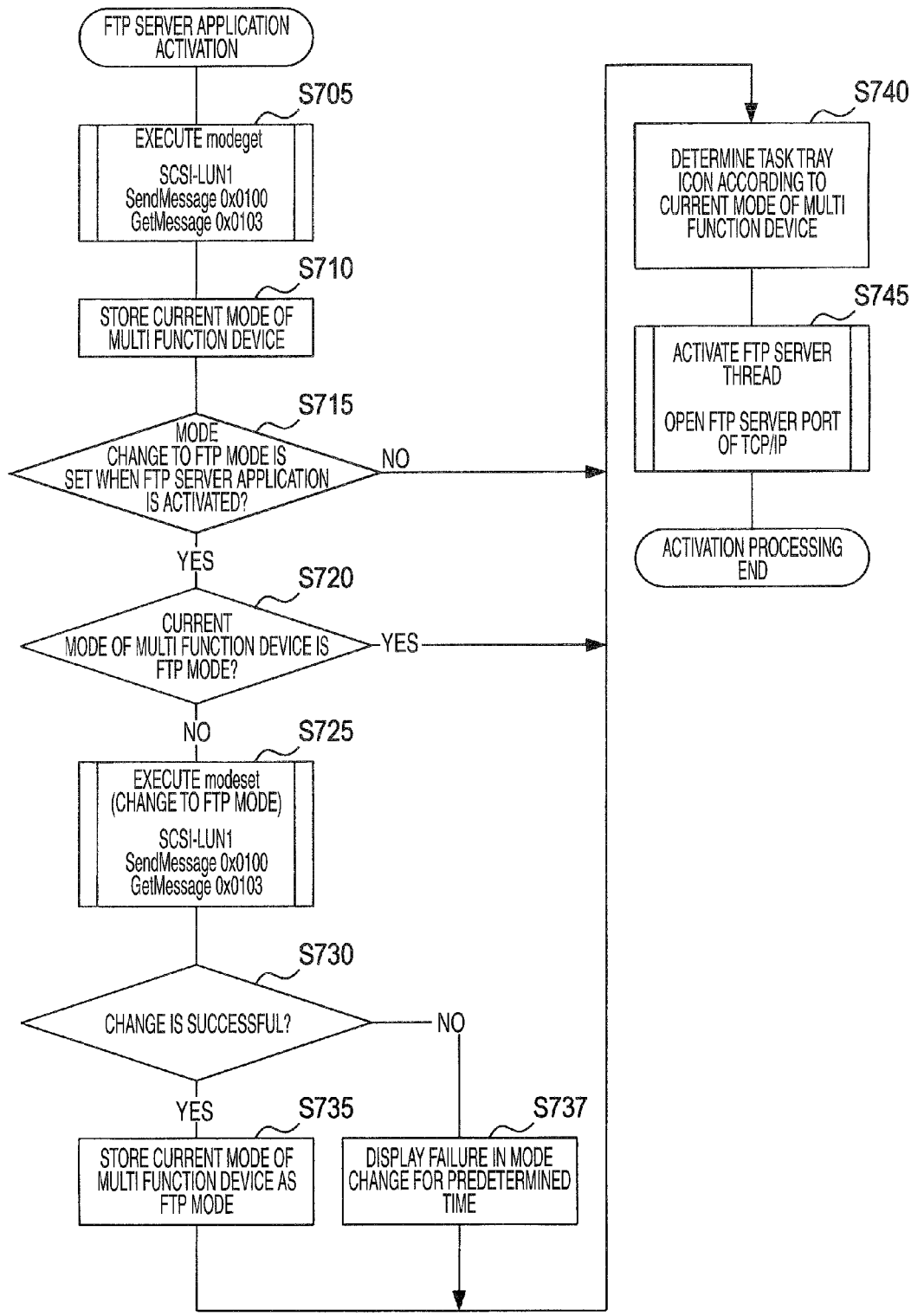
FIG. 12 is a flowchart of a processing to be executed when a FTP server application is activated.
Figure 13A:
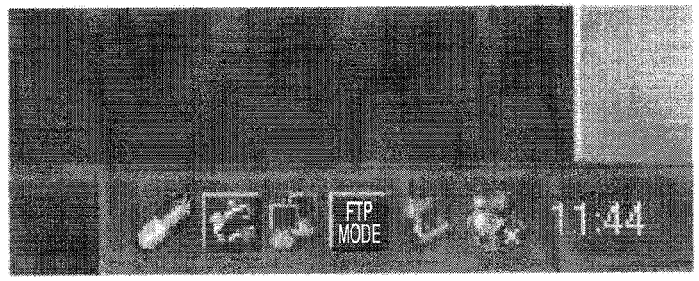
FIGS. 13A to 13C are explanatory views of an icon to be displayed on the PC.
Figure 13B:
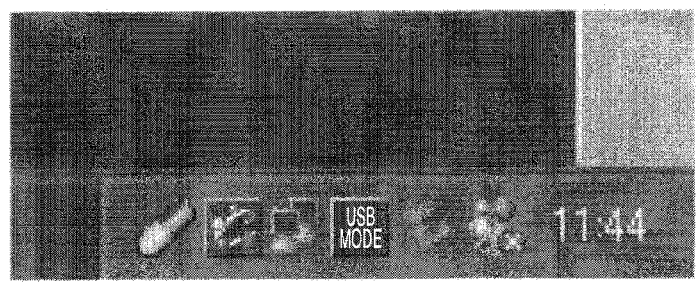

In this way, if the processing shown in FIG. 12 is ended, the current mode of the multi function device 1 is displayed in a task tray (an information notification region based on the standard of Windows (Registered Trademark) serving as the OS) on the display section of the PC 2 as indicated by an icon in FIG. 13A or 13B.

Figure 13C:
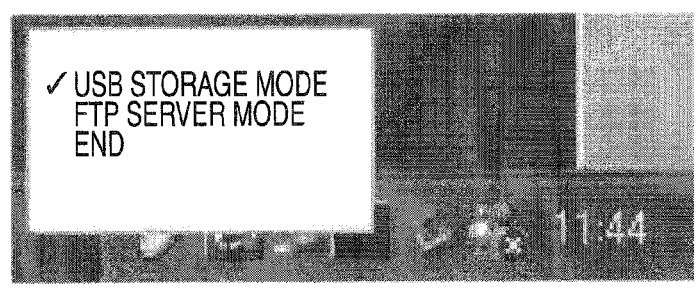

If this icon is clicked by a pointing device, as shown in FIG. 13C, a popup window is displayed. In the popup window, a mode list and an item for instructing to end an application are displayed. Here, by clicking one of these items with the pointing device, the user can instruct the FTP server application 281 to switch the mode or to end the application.

A processing to be executed by the FTP server application 281 when the user instructs the mode change will be described below.

(Switching Processing to FTP Mode by FTP Server Application)

Figure 14:
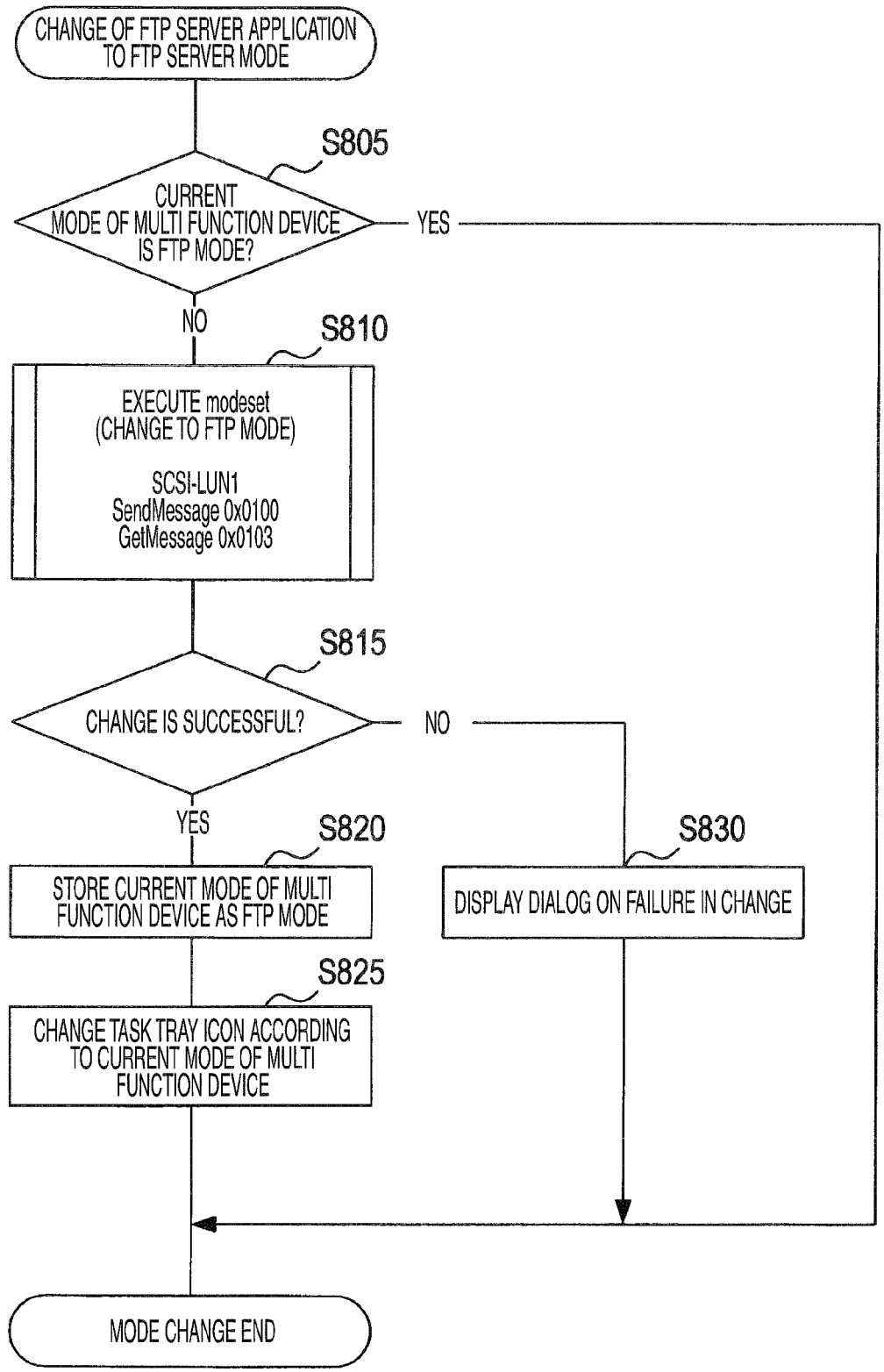
FIG. 14 is a flowchart of a switching processing to an FTP mode by the FTP server application.

Next, a processing to be executed by the FTP server application 281 when the user instructs the FTP server application 281 to switch the multi function device to the FTP mode will be described with reference to FIG. 14.

If this processing starts, the PC 2 first determines whether or not the current mode of the multi function device 1 is the FTP mode (S805). When the current mode is the FTP mode (S805: Yes), it is not necessary to perform the mode change, and thus the processing shown in FIG. 14 is ended.

In S805, when the current mode is not the FTP mode (S805: No), the PC 2 executes modeset (S810). Specifically, the SCSI commands "SendMessage/Stream Selection 0x0100: File Access Command Output" and "GetMessage/ Stream Selection 0x0103: File Access Status Input" are issued with SCSI-LUN=1 assigned, such that the multi function device 1 is requested to execute the modeset command. This processing is the same as S725 described above, and thus a further description thereof will be omitted.

If S810 is ended, the PC 2 determines whether or not the mode change is successful (S815). When the mode change is successful (S815: Yes), the current mode of the multi function device 1 is stored as the FTP mode (S820), and the task tray icon is changed according to the current mode of the multi function device 1 (S825). Thus, the processing shown in FIG. 14 is ended.

When it is determined in S815 that the mode change is failed (S815: No), the PC 2 displays a dialog indicative of a failure in the mode change (S830). Thus, the processing shown in FIG. 14 is ended.

(Switching Processing to USB Mode by FTP Server Application)

Figure 15:
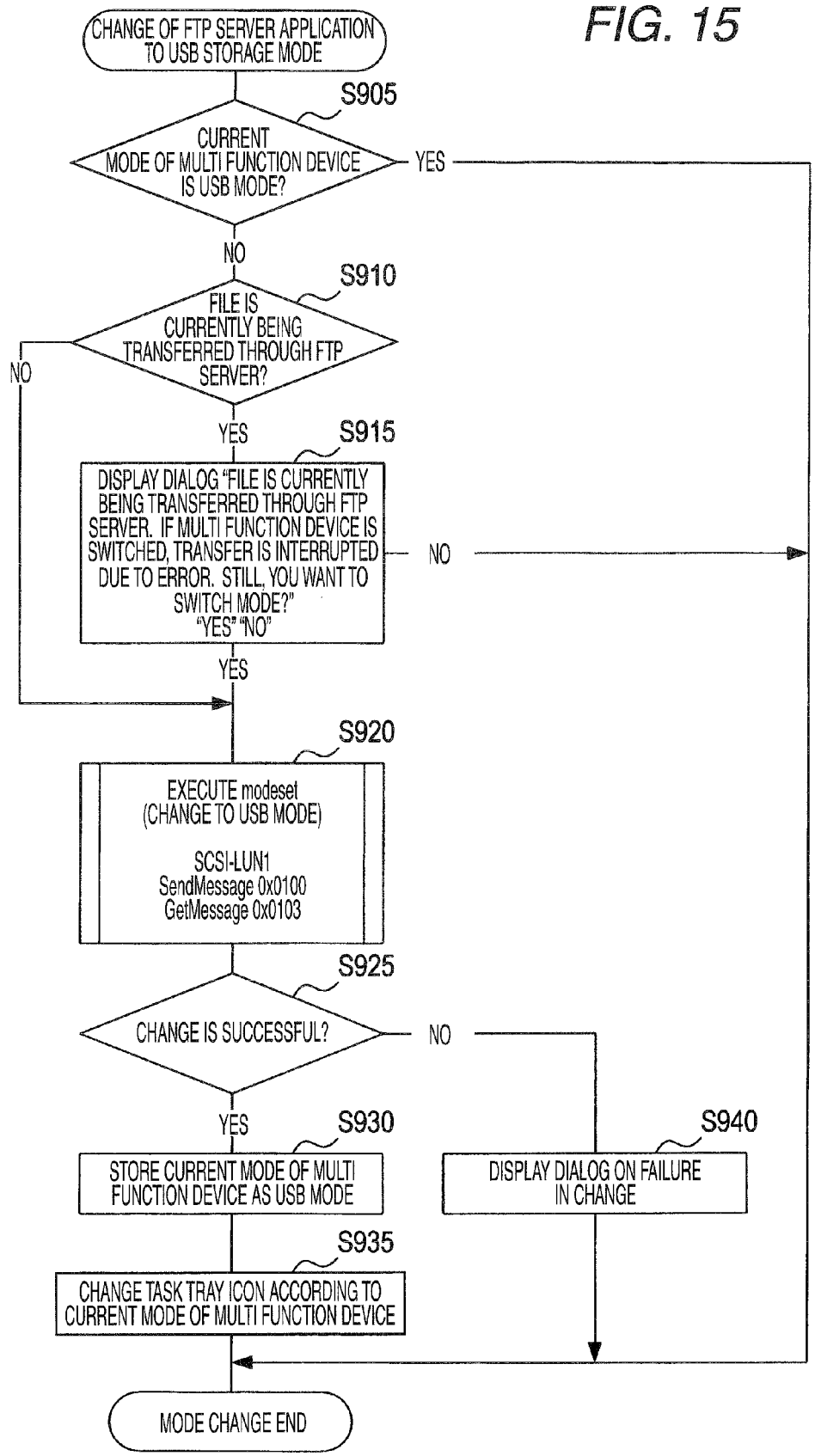
FIG. 15 is a flowchart of a switching processing to a USB mode by the FTP server application.

Next, a processing to be executed by the FTP server application 281 when the user instructs the FTP server application 281 to switch the multi function device to the USB mode will be described with reference to FIG. 15.

If this processing starts, the PC 2 first determines whether or not the current mode of the multi function device 1 is the USB mode (S905). When the current mode is the USB mode (S905: Yes), it is not necessary to perform the mode change, and thus the processing shown in FIG. 15 is ended.

In S905, when the current mode is not the USB mode (S905: No), it is determined whether or not a file is currently being transferred through the FTP server (S910). When a file is being transferred through the FTP server (S910: Yes), a dialog is displayed (S915).

In this dialog, a message, "A file is currently being transferred through the FTP server. If the multi function device 1 is switched, transfer is interrupted due to an error. Still, you want to switch the mode?". To this message, the user can select one of "Yes" and "No".

When the user selects "No" (S915: No), the processing shown in FIG. 15 is ended. When the user selects "Yes" (S915: Yes), the process proceeds to S920. In addition, when it is determined in S910 that no file is being transferred through the FTP server (S910: No), S915 is skipped, and then the process proceeds to S920.

In this way, if the process proceeds to S920, the PC 2 executes modeset (S920). Specifically, the SCSI commands "SendMessage/Stream Selection 0x0100: File Access Command Output" and "GetMessage/Stream Selection 0x0103: File Access Status Inputs" are issued with SCSI-LUN=1 assigned, such that the multi function device 1 is requested to execute the modeset command. This processing is the same as S725 or S810 described above, except that the mode change to the USB mode is performed, and thus a further description thereof will be omitted.

If S920 is ended, the PC 2 determines whether or not the mode change is successful (S925). When the mode change is successful (S925: Yes), the USB mode is stored as the current mode of the multi function device 1 (S930), a task tray icon is changed according to the current mode of the multi function device 1 (S935), and the processing shown in FIG. 15 is ended.

When it is determined in S925 that the mode change is failed (S925: No), the PC 2 displays a dialog indicative of a failure in the mode change (S940), and the processing shown in FIG. 15 is ended.

ADVANTAGE OF FIRST EMBODIMENT

As described above, according to the multi function device 1, the multi function device 1 is switched between the USB mode and the FTP mode according to the instruction from the PC 2. Then, when the multi function device 1 is switched to the USB mode, the first memory slot 151, the second memory slot 152, the third memory slot 153, and the fourth memory slot 154 in the multi function device 1 can be recognized and used by the PC 2 as a USB storage device.

Therefore, various applications compliant with the USB storage device can access the files on the card mounted to the first memory slot 151, the second memory slot 152, the third memory slot 153, and the fourth memory slot 154.

In addition, when the multi function device 1 is switched to the FTP mode, an exclusive-use application compliant with the multi function device 1 (for example, the FTP server application 281) can access the files on the card mounted to the first memory slot 151, the second memory slot 152, the third memory slot 153, and the fourth memory slot 154.

Furthermore, the exclusive-use application compliant with the multi function device 1 (for example, the FTP server application 281) accesses the files on the card through the file system task 163 of the multi function device 1, thereby performing an access in file unit.

That is, unlike various applications compliant with the USB storage device, which access the files on the card through the file system 231 of the PC 2, the FTP server application 281 does not access the files on the card in physical sector unit.

In such an FTP server application 281, the multi function device 1 can manage file access start (fopen) and access end (fclose). For this reason, the FTP server application 281 can perform file access through the file system task 163 on even ground with the above-described medium print function 171 or the like. Then, if file access is ended, the file system task 163 may immediately release the right of use of the memory slot control task 145.

For this reason, unlike the USB storage device that uses the physical sector unit input/output task 143, there is no case in which it takes a lot of time to release the right of use of the memory slot control task 145 due to S250 and S255, and thus a wasteful occupation time of the memory slot control task 145 can be reduced.

Therefore, as for the access request from the PC 2 and the access request from a data processing section in the device (the media print function 171 or the FTP server task 173), immediately after one access request is processed, the other one can be processed. As a result, a rapid processing can be achieved.

Furthermore, even if the access request from the PC 2 and the access request from the data processing section in the device are simultaneously generated, these requests are both managed and processed by the file system task 163 in the device.

For this reason, unlike a case in which input/output in physical sector unit and input/output through the file system task are simultaneously generated, even if a plurality of access requests are generated, there is no problem. These requests may be processed seemingly simultaneously or in parallel under the control of the file system task 163.

Therefore, as described above, if the access request from the PC 2 and the access request from the data processing section in the device are configured to be both managed by the file system task 163, there is no case in which the medium print function 171 or the FTP server task 173 stands by due to the access request from the PC 2. As a result, there is a high possibility that the medium print function 171 or the FTP server task 173 accesses the files on the card mounted to the first memory slot 151, the second memory slot 152, the third memory slot 153, and the fourth memory slot 154.

Furthermore, even if the multi function device 1 is switched to one of the USB mode and the FTP mode, the PC 2 can access the multi function device 1 through a single USB interface.

Therefore, exclusive-use communication interfaces do not need to be provided separately for the USB mode and the FTP mode. As a result, hardware for a communication interface required in the multi function device 1 or the PC 2 can be reduced, and thus hardware can be simplified.

(2) SECOND EMBODIMENT

Next, a second embodiment will be described.

In the second embodiment, instead of the FTP server in the first embodiment, a server application other than the FTP service is used.

That is, in the foregoing embodiment, the FTP server application 281 is provided in the PC 2 to function as the FTP server, and accesses the files in the multi function device 1 according to the request from the FTP client, but a protocol other than the FTP protocol may be used insofar as a file can be transmitted.

For example, instead of the FTP server, an HTTP (Hyper-Text Transfer Protocol) server or a CIFS (Common Internet File System) server may be used. Hereinafter, a case in which a CIFS server is used will be described.

When the CIFS server is used, as shown in FIG. 16, a CIFS server application 291, instead of the FTP server application 281, is provided in the PC 2. Then, an access to the CIFS server application 291 is performed by using a CIFS client (for example, an explorer 293) on the client computer through a TCP/IP protocol 283, while passing through a file system 295, a Microsoft (Registered Trademark) network client 297.

The CIFS server application 291 is provided with a "file access function to the multi function device 1", like the FTP server application 281. Accordingly, the CIFS server application 291 can access the files in the multi function device 1 according to a request from the CIFS client. With this configuration, the same advantages as the above-described first embodiment can be obtained.

In the second embodiment, the CIFS server, instead of the FTP server, is used, but if necessary, both the FTP server and the CIFS server may be used. In this case, in addition to the USB mode and the FTP mode in the first embodiment, a CIFS mode is further provided.

Figure 17A:
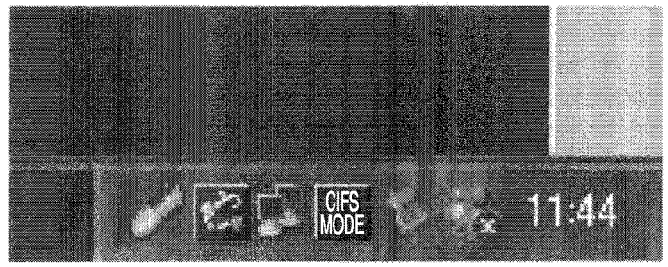
FIGS. 17A and 17B are explanatory views of an icon to be displayed on the PC according to the second embodiment of the invention.

Similarly to the foregoing embodiment, these modes may be displayed on the display section of the PC 2 by icons. Specifically, when the multi function device 1 is in the CIFS mode, as shown in FIG. 17A, the current mode of the multi function device 1 may also be displayed on the display section of the PC 2.

Figure 17B:
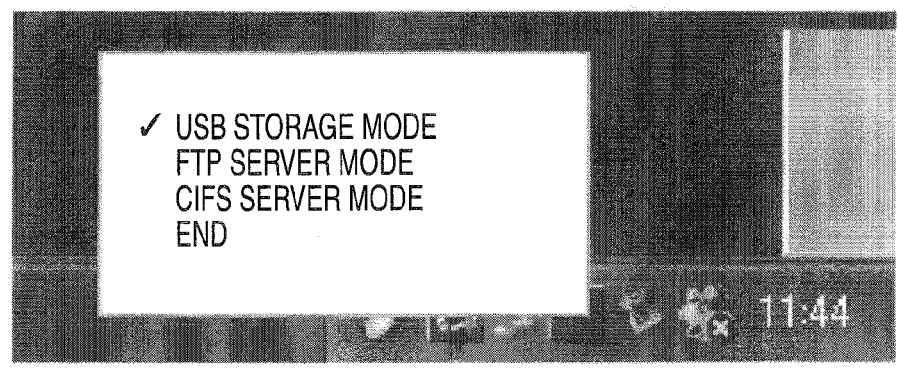

Similarly to the foregoing embodiment, if this icon is clicked by the pointing device, as shown in FIG. 17B, a popup window may be displayed. In addition, similarly to the foregoing embodiment, the user may instruct the mode change or application end by a click operation.

(3) THIRD EMBODIMENT

Next, a third embodiment will be described.

In the foregoing first and second embodiments, as an example of the device which is recognized as a USB storage device by the PC 2, the multi function device 1 is used. However, according to the invention, a device other than the multi function device 1 may be used insofar as it is a device which is recognized as a USB storage device.

In particular, the multi function device 1 is recognized by the PC 2 as a USB multi function device, and one of a plurality of logical units in the USB multi function device is a USB storage device, but whether or not the multi function device 1 is recognized as a USB multi function device may be arbitrarily set.

That is, when the multi function device 1 is recognized as a USB storage device constituted from a single logical unit, not a USB multi function device, the invention may be applied. Alternatively, a USB storage device may include a plurality of logical units, which are identified by the LUN (note: other than the above-mentioned SCSI-LUN) based on the USB standard, not a single logical unit. The invention may also be applied to such a device.

In the following third embodiment, as an example of a device which is recognized as a USB storage device constituted from a single logical unit, a digital camera (digital still camera) will be described.

Figure 18:
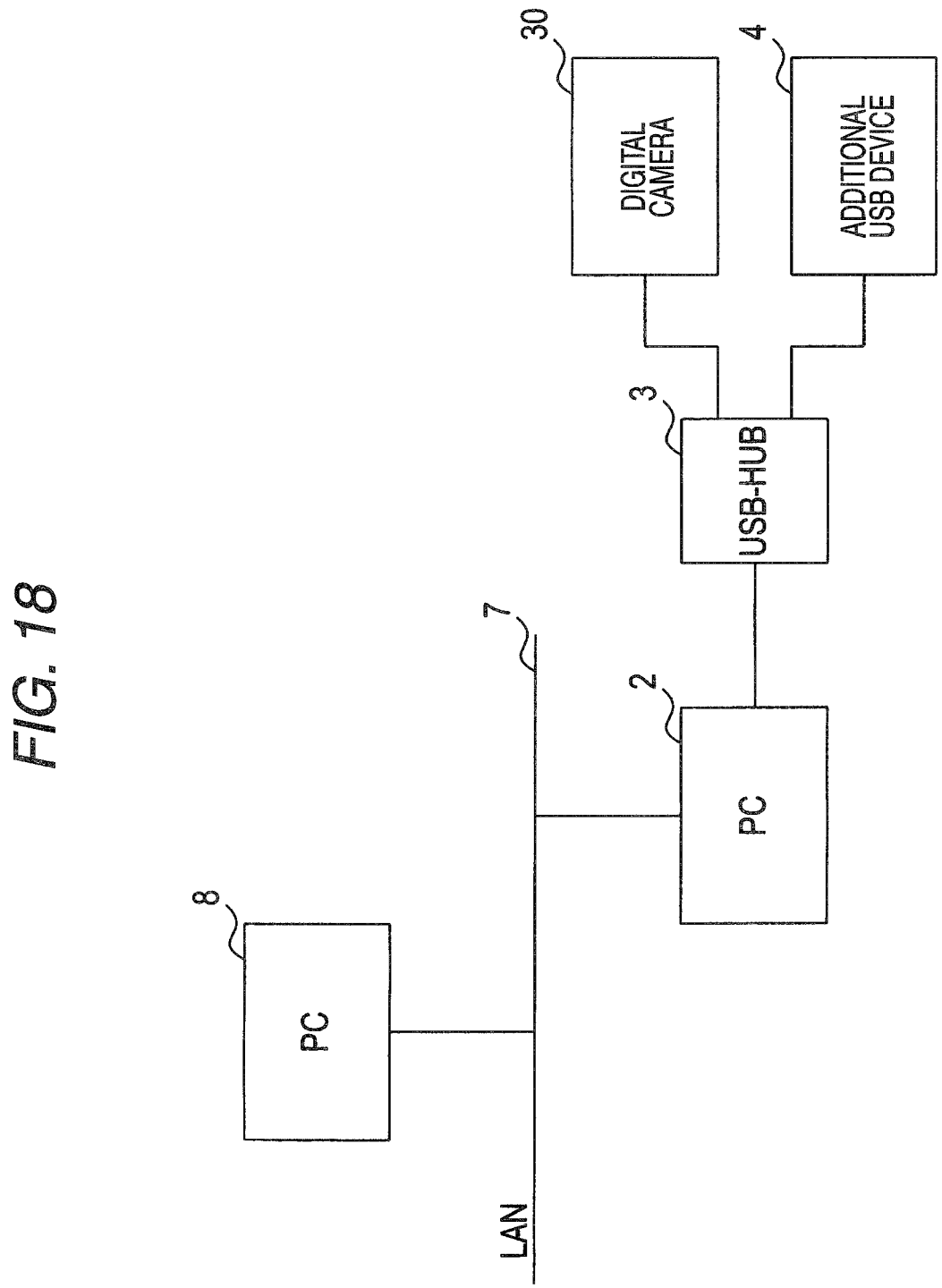
FIG. 18 is a block diagram showing an entire file transfer system according to a third embodiment of the invention.
Figure 19:
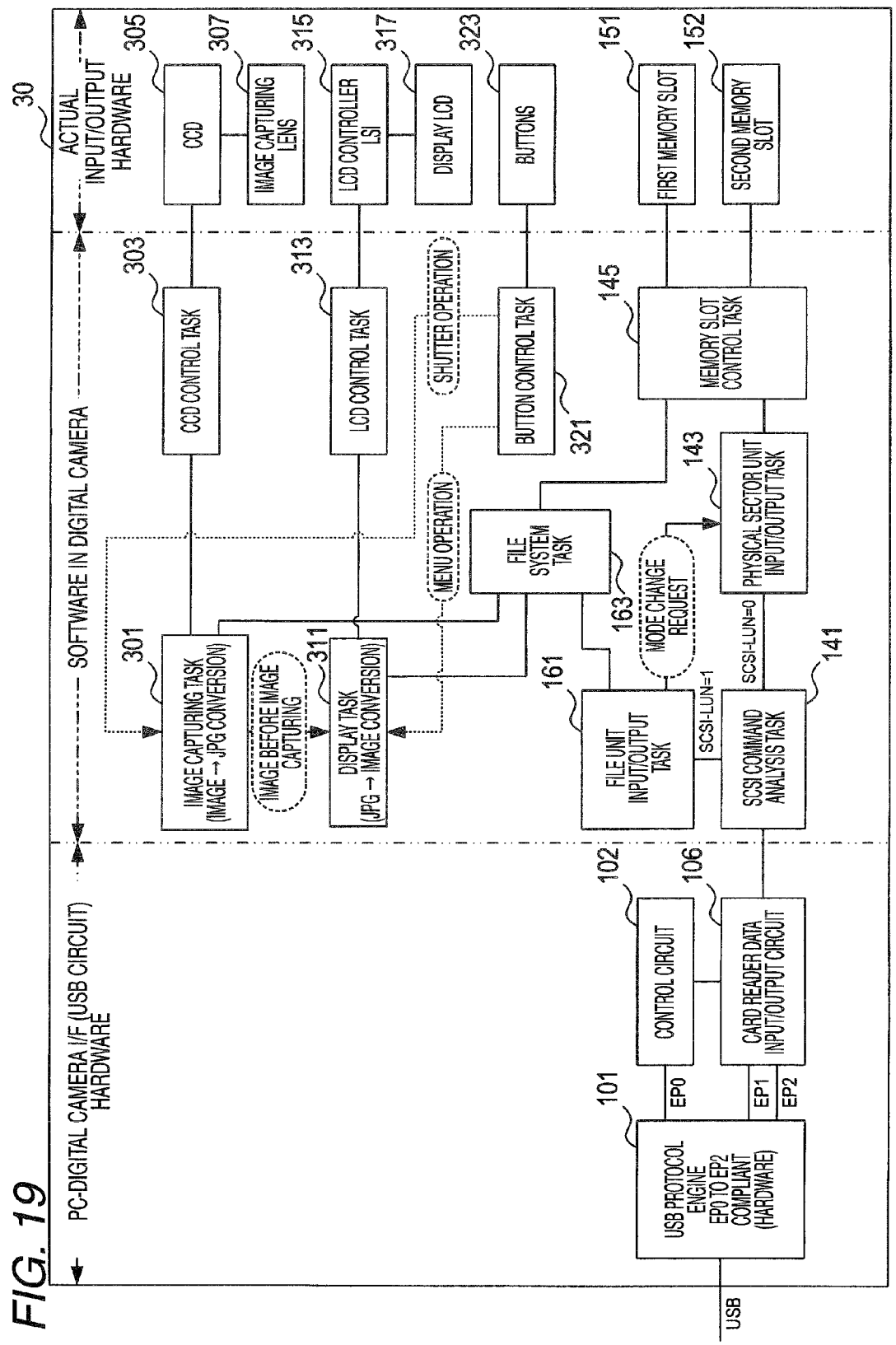
FIG. 19 is a block diagram showing the internal configuration of a digital camera.
Figure 20:
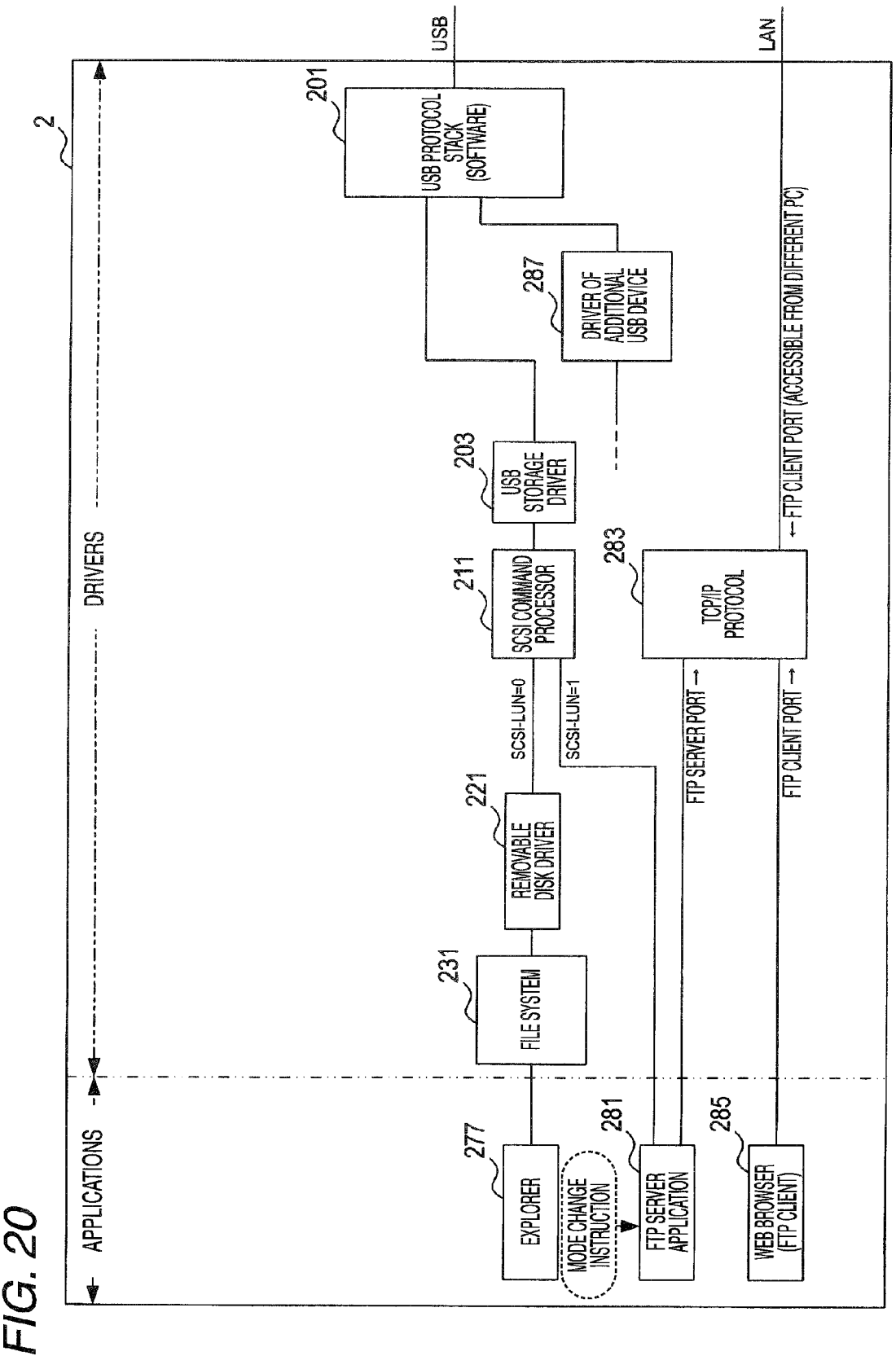
FIG. 20 is a block diagram showing the internal configuration of a PC when a digital camera is connected.

Similarly to the above-described multi function device 1, a digital camera 30 shown in FIG. 18 is connectable to the PC 2 through a USB interface (in FIG. 18, a USB-HUB 3).

Specifically, the digital camera 30 includes a USB protocol engine 101, a control circuit 102, a card reader data input/output circuit 106, a SCSI command analysis task 141, a physical sector unit input/output task 143, a memory slot control task 145, a first memory slot 151, and a second memory slot 152.

These have the substantially same functions as those of the multi function device 1, which are represented by the same reference numerals. With this configuration, the digital camera 30 can function as a USB storage device.

The digital camera 30 further includes an image capturing system including an image capturing task 301, a CCD control task 303, a CCD 305, and an image capturing lens 307, a display system including a display task 311, an LCD control task 313, an LCD controller LSI 315, and a display LCD 317, and an operation system including a button control task 321 and buttons 323.

When data captured by the image capturing system is write to a memory card mounted to the first memory slot 151 or the second memory slot 152, an access in file unit through the file system task 163 is performed.

When data read from the memory card mounted to the first memory slot 151 or the second memory slot 152 is displayed by the display system, an access in file unit through the file system task 163 is also performed.

The image capturing system, the display system, and the operation system, or the file system in the digital camera is well known and used in a general digital camera.

In addition to the above-described configuration, the digital camera 30 further includes a file unit input/output task 161. The file unit input/output task 161 has the same function as that in the multi function device 1, which is represented by the same reference numeral. Accordingly, the digital camera 30 can be operated in the FTP server mode, similarly to the multi function device 1.

That is, as will be apparent from the comparison between the configuration of the digital camera 30 and the configuration of the multi function device 1, similarly to the multi function device 1, the digital camera 30 can be switched between the USB storage mode and the FTP server mode.

If the digital camera 30 is connected to the PC 2, in the PC 2, a USB protocol stack 201, a USB storage driver 203, a SCSI command processor 211, a removable disk driver 221, and a file system 231 are operated.

Accordingly, when the digital camera 30 is switched to the USB storage mode, similarly to the multi function device 1, the digital camera 30 can be used as a USB storage device. Specifically, an access to the files in the digital camera 30 is performed by software, such as the explorer 277.

In addition, in the PC 2, a FTP server application 281 and a TCP/IP protocol 283 are operated. Therefore, when the digital camera 30 is switched to the FTP server mode, the digital camera 30 also operates, similarly to the multi function device 1.

That is, when an access request from the WEB browser 285 serving as the FTP client is received, a file access request can be issued from the FTP server application 281 to the digital camera 30.

In general, in a digital camera which is recognized as a USB storage device when being connected to the PC, if it is connected to the PC, an image capturing function or a photograph display function is disabled, and only a function as a USB storage device (card reader function) is enabled. For this reason, when the user wants to use the image capturing function or the photography display function, the digital camera needs to be disconnected from the PC.

In contrast, in case of the digital camera 30, if it is switched to the FTP server mode, while a file access from the PC 2 is permitted (that is, the card reader function is available) in a state in which the digital camera 30 is connected to the PC 2, the image capturing function or the photography display function can also be used.

(4) FOURTH EMBODIMENT

In a fourth embodiment, as an example of a device which is recognized as a USB storage device constituted from a single logical unit, an MP3 player (portable audio player) will be described.

Figure 21:
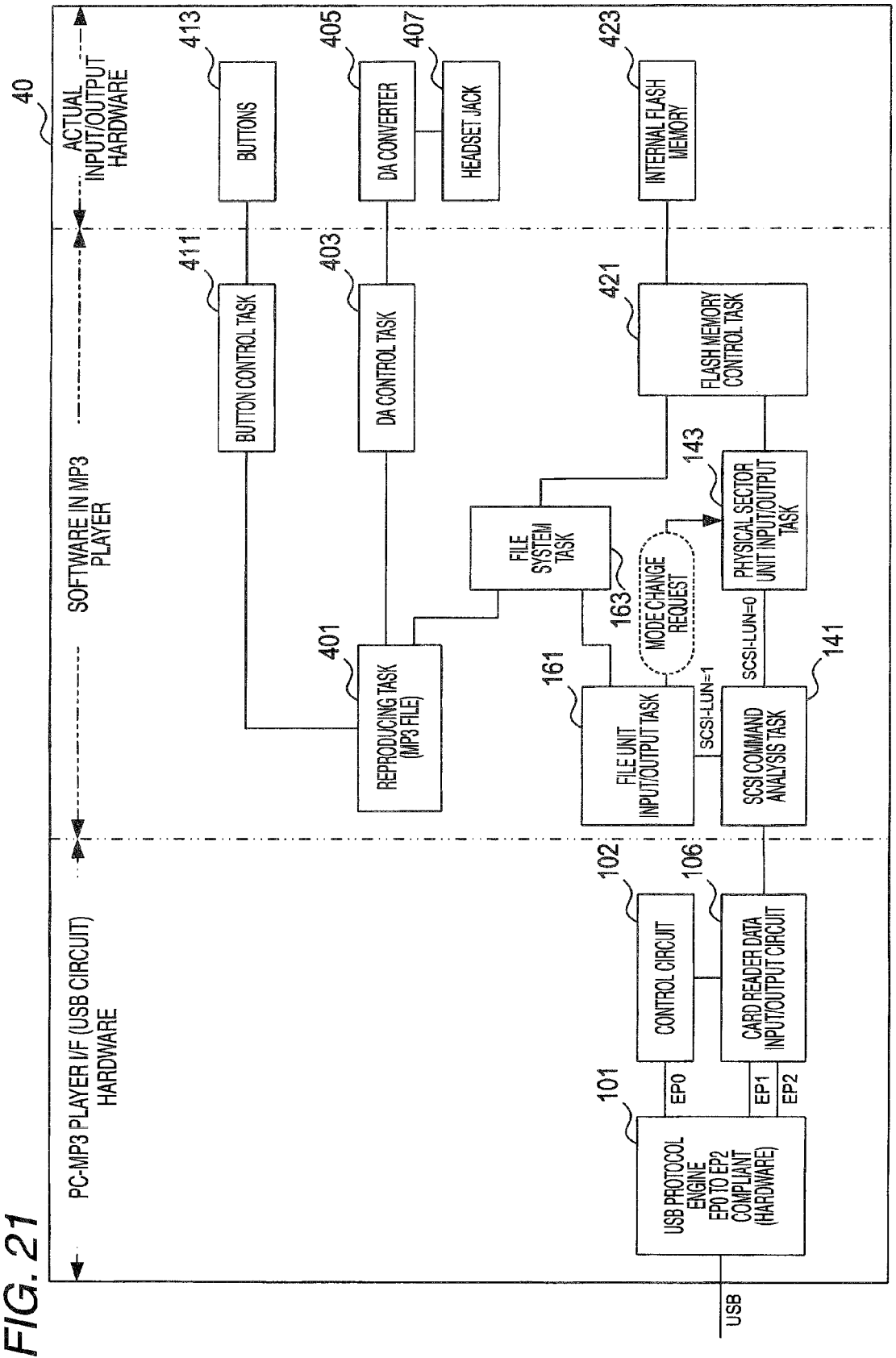
FIG. 21 is a block diagram showing the internal configuration of a MP3 player according to a fourth embodiment of the invention.

FIG. 21 is a block diagram showing the internal configuration of an MP3 player 40. Similarly to the multi function device 1 or the digital camera 30, the MP3 player 40 includes a USB protocol engine 101, a control circuit 102, a card reader data input/output circuit 106, a SCSI command analysis task 141, and a physical sector unit input/output task 143. These have the substantially same functions as those in the multi function device 1 or the digital camera 30, which are represented by the same reference numerals.

The MP3 player 40 further includes a reproducing system including a reproducing task 401, a DA control task 403, a DA converter 405, and a headset jack 407, and an operation system including a button control task 411 and buttons 413.

The MP3 player 40 further includes a flash memory control task 421 and an internal flash memory 423. These correspond to the memory slot control task 145 and the first memory slot 151 or the second memory slot 152 in the multi function device 1 or the digital camera 30. A difference from the multi function device 1 or the digital camera 30 is that attachment/detachment of the memory card is impossible.

The MP3 player 40 can also function as a USB storage device when being connected to the PC 2. In addition, when data read from the internal flash memory 423 is reproduced by the reproducing system, an access in file unit through the file system task 163 is performed.

In addition to the above-described configuration, the MP3 player 40 further includes a file unit input/output task 161. The file unit input/output task 161 has the same function as that in the multi function device 1 or the digital camera 30, which is represented by the same reference numeral. Therefore, the MP3 player 40 can be operated in the FTP server mode, similarly to the multi function device 1.

That is, as will be apparent from the comparison between the configuration of the MP3 player 40 and the configuration of the multi function device 1, the MP3 player 40 can also be switched between the USB storage mode and the FTP server mode, similarly to the multi function device 1 or the digital camera 30.

In general, in an MP3 player which is recognized as a USB storage device when being connected to the PC, if it is connected to the PC, a music reproducing function is disabled, and only a function as a USB storage device (card reader function) is enabled. For this reason, when the user wants to use the music reproducing function, the MP3 player needs to be disconnected from the PC.

In contrast, in the MP3 player 40, if it is switched to the FTP server mode, while a file access from the PC 2 is permitted (that is, the card reader function is available) in a state in which the MP3 player is connected to the PC 2, the music reproducing function can also be used.

(5) MODIFICATIONS

Although the embodiments of the invention have been described, the invention is not limited to the embodiments, and various changes and modifications may be made.

In the first and second embodiments, the multi function device is used as a device which is recognized as a USB multi function device when being connected to the PC, and in the third and fourth embodiments, the digital camera and the MP3 player are used as a device which is recognized as a USB storage device when being connected to the PC, respectively. However, the invention can be applied to devices having other functions. For example, the invention may be applied to an IC recorder or a cellular phone.

In the first embodiment, the FTP server application 281 issues an access request when the multi function device 1 is in the FTP mode, and does not issue an access request when the multi function device 1 is in the USB mode, but alternatives may be considered.

For example, the FTP server application 281 may issue an access request, and the multi function device 1 may return an access rejection response. In this case, as an example of the access rejection response, a response indicating that no medium is loaded may be considered.

In the first embodiment, a device which is recognized as a USB storage device is the multi function device 1 to which a removable medium can be mounted. According to the invention, however, a device which is recognized as a USB storage device is not necessarily adapted to mount a removable medium thereto.

Specifically, like the MP3 player 40 according to the fourth embodiment, a device having the internal flash memory 423 may be used. In this case, the internal flash memory 423 may be removably mounted to the MP3 player 40 or not.

In the first embodiment, the WEB browser 285 serving as the FTP client and the FTP server application 281 are installed in the same PC 2, but they may be installed in different PCs which are communicable through a LAN.

That is, if a client computer including the WEB browser 285 serving as the FTP client and a server computer including the FTP server application 281 are communicable through a logical data transmission line according to the TCP/IP, they may be physically the same PC or different PCs. The same is applied to a case in which HTTP or CIFS, instead of FTP, is used.

What is claimed is:

1. A device that is connectable to a computer through a USB (Universal Serial Bus) interface and is recognized by the computer as a USB multi function device capable of functioning as a plurality of devices comprising at least a USB storage device, the device comprising:

a data storage section configured to access a data storable physical storage area, and read data stored in the physical storage area or write data to the physical storage area;

a file system configured to manage data to be stored in the physical storage area of the data storage section as a file, provide an interface for accessing to the file, and enable reading of data stored in the file or writing of data to the file by an access with the interface;
a data processing section configured to execute a predetermined data processing, and during the data processing, access the file through the file system;
a mode switching section configured to switch the device to one of a first mode in which an access from the computer to the USB storage device is permitted and a second mode in which an access from the computer to the USB storage device is prohibited;
a data analysis section configured to, when a data string is transmitted from the computer through a logical data transmission line between the computer and the USB storage device, analyze whether the data string is a standard data string transmitted for an access to the USB storage device or a particular data string other than the standard data string;
a mode determination section configured to, when the data analysis section analyzes that the data string is the standard data string, determine which of the first and second modes is selected by the mode switching section;
a physical area unit access section configured to, when the mode determination section determines that the device is switched to the first mode, access the physical storage area of the data storage section based on information in the standard data string, and transmit response data corresponding to the access to the computer through the data transmission line;
a pseudo response section configured to, when the mode determination section determines that the device is switched to the second mode, transmit a pseudo response to the computer through the data transmission line, the pseudo response indicating that no storage medium is mounted to the data storage section; and
a file unit access section configured to, when the data analysis section analyzes that the data string is the particular data string, access a file through the file system based on information in the particular data string, and transmit response data corresponding to the access to the computer through the data transmission line.

2. The device according to claim 1,
wherein the data analysis section determines, on the basis of a data string based on the SCSI standard transmitted from the computer through the data transmission line, whether the data string is the standard data string or the particular data string according to whether or not the value of an LUN (Logical Unit Number) field in the data string is "0".

3. The device according to claim 1, further comprising:
a file access request determination section configured to, when the data analysis section analyzes that the data string is the particular data string, determine whether or not the particular data string is a data string requesting to access the file on the basis of information in the particular data string,
wherein, when the file access request determination section determines that the particular data string is the data string requesting to access the file, the file unit access section accesses the file through the file system, and transmits a response data corresponding to the access to the computer through the data transmission line.

4. The device according to claim 3, further comprising:
a mode switching request determination section configured to, when the data analysis section analyzes that the data string is the particular data string, determine whether or not the particular data string is a data string requesting the mode switching section of mode switching on the basis of information in the particular data string,
wherein, when the mode switching request determination section determines that the particular data string is the data string requesting of mode switching, the mode switching section switches the device to one of the first mode and the second mode on the basis of information in the particular data string.

5. The device according to claim 1,
wherein the device comprises a multi function device having at least a printer function and a memory card function, and
wherein the data processing section is configured to execute a data processing to print an image on the basis of image data read from a file on a memory card, and during the data processing, access the file through the file system.

6. The device according to claim 1,
wherein the device comprises a digital camera having at least a still image capturing function, and
wherein the data processing section is configured to execute a data processing to write a captured still image to a file on a memory, and during the data processing, access the file through the file system.

7. The device according to claim 1,
wherein the device comprises a portable audio player having at least a music reproducing function, and
wherein the data processing section is configured to execute a data processing to reproduce music based on audio data read from a file on a memory, and during the data processing, access the file through the file system.

8. A file transfer system, comprising:
a computer; and
a device connectable to the computer through a USB (Universal Serial Bus) interface and being recognized by the computer as a USB multi function device capable of functioning as a plurality of devices comprising at least a USB storage device,
wherein the device comprises:
a data storage section configured to access a data storable physical storage area, and read data stored in the physical storage area or write data to the physical storage area;
a file system configured to manage data to be stored in the physical storage area of the data storage section as a file, provide an interface for accessing to the file, and enable reading of data stored in the file or writing of data to the file by an access with the interface;
a data processing section configured to execute a predetermined data processing, and during the data processing, access the file through the file system;
a mode switching section configured to switch the device to one of a first mode in which an access from the computer to the USB storage device is permitted and a second mode in which an access from the computer to the USB storage device is prohibited;
a data analysis section configured to, when a data string is transmitted from the computer through a logical data transmission line between the computer and the USB storage device, analyze whether the data string is a standard data string transmitted for an access to the USB storage device or a particular data string other than the standard data string;
a mode determination section configured to, when the data analysis section analyzes that the data string is the standard data string, determine which of the first and second modes is selected by the mode switching section;

a physical area unit access section configured to, when the mode determination section determines that the device is switched to the first mode, access the physical storage area of the data storage section based on information in the standard data string, and transmit response data corresponding to the access to the computer through the data transmission line;

a pseudo response section configured to, when the mode determination section determines that the device is switched to the second mode, transmit a pseudo response to the computer through the data transmission line, the pseudo response indicating that no storage medium is mounted to the data storage section; and a file unit access section configured to, when the data analysis section analyzes that the data string is the particular data string, access a file through the file system based on information in the particular data string, and transmit response data corresponding to the access to the computer through the data transmission line, and wherein the computer comprises a server computer that is capable of transmitting a file to a client computer having a client function, and on the basis of an access request from the client computer, the computer is configured to transmit the access request to the file unit access section provided in the device through the data transmission line and to transmit the response data from the device according to the access request to the client computer.

* * * * *